US011933677B2

(12) United States Patent
Aida et al.

(10) Patent No.: US 11,933,677 B2
(45) Date of Patent: Mar. 19, 2024

(54) TEMPERATURE DETECTING MATERIAL, TEMPERATURE DETECTING INK USING SAME, TEMPERATURE INDICATOR, AND PRODUCT CONTROL SYSTEM

(71) Applicant: Hitachi Industrial Equipment Systems Co., Ltd., Tokyo (JP)

(72) Inventors: Kohhei Aida, Tokyo (JP); Shunsuke Mori, Tokyo (JP); Masahiro Kawasaki, Tokyo (JP); Kotaro Araya, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 1189 days.

(21) Appl. No.: 16/606,073

(22) PCT Filed: Mar. 20, 2018

(86) PCT No.: PCT/JP2018/011225
§ 371 (c)(1),
(2) Date: Oct. 17, 2019

(87) PCT Pub. No.: WO2018/193781
PCT Pub. Date: Oct. 25, 2018

(65) Prior Publication Data
US 2020/0041359 A1    Feb. 6, 2020

(30) Foreign Application Priority Data
Apr. 17, 2017  (JP) .................................. 2017-081216

(51) Int. Cl.
*G01K 11/12*  (2021.01)
*C09B 9/00*   (2006.01)
(Continued)

(52) U.S. Cl.
CPC ................ *G01K 11/16* (2013.01); *C09B 9/00* (2013.01); *C09D 11/50* (2013.01); *G01N 31/229* (2013.01);
(Continued)

(58) Field of Classification Search
CPC .......... G01K 11/16; G01K 11/12; C09B 9/00; C09D 11/50; G01N 31/229;
(Continued)

(56) References Cited

U.S. PATENT DOCUMENTS 4,613,878 A * 9/1986 Inaba ....................... B41M 5/34
427/151
6,096,683 A * 8/2000 Amano ................... B41M 5/363
503/201
(Continued)

FOREIGN PATENT DOCUMENTS

DE   102 18 057 A1   11/2003
FR   2 731 517 A1    9/1996
(Continued)

OTHER PUBLICATIONS

U.S. Appl. No. 6606073, filed Oct. 30, 2023_WO_2018193781_A1_H.pdf,Oct. 2018.*
(Continued)

*Primary Examiner* — Gail Kaplan Verbitsky
(74) *Attorney, Agent, or Firm* — Crowell & Moring LLP

(57) ABSTRACT

A temperature detecting material comprises a first material containing a first temperature indicating material and a second material containing a second temperature indicating material, wherein the first temperature indicating material and the second temperature indicating material contain a leuco dye, a color developing agent, and a decoloring agent, and have a hysteresis characteristic in their color density-temperature curves, wherein the first temperature indicating
(Continued)

material has a color developing temperature in a temperature increase process lower than a decoloring temperature in the temperature increase process, and turns to a non-crystalline state and is kept in a decoloring state when cooled down below the color developing temperature in the temperature increase process with a predetermined cooling speed or more after melting, wherein the second temperature indicating material, a color developing temperature is lower than a decoloring temperature in the temperature increase process, and wherein the color developing temperature in the temperature increase process is lower than the decoloring temperature in the temperature increase process and the color developing temperature is lower than the color developing temperature in the temperature increase process.

14 Claims, 17 Drawing Sheets

(51) Int. Cl.
  *C09D 11/50* (2014.01)
  *G01K 11/16* (2021.01)
  *G01N 31/22* (2006.01)
  *G05B 19/418* (2006.01)

(52) U.S. Cl.
  CPC ... *G05B 19/4183* (2013.01); *G05B 19/41875* (2013.01); *G01K 11/12* (2013.01); *G05B 2219/32368* (2013.01); *G05B 2219/49302* (2013.01)

(58) Field of Classification Search
  CPC .......... G05B 19/4183; G05B 10/41875; G05B 2219/32368; G05B 2219/49302; C09J 201/00; C09J 11/00
  See application file for complete search history.

(56) References Cited

U.S. PATENT DOCUMENTS

| | | | | |
|---|---|---|---|---|
| 6,816,149 | B1 * | 11/2004 | Alsleben | G06F 3/03543 374/161 |
| 11,635,335 | B2 * | 4/2023 | Aida | G01K 3/04 374/162 |

FOREIGN PATENT DOCUMENTS

| | | | | |
|---|---|---|---|---|
| FR | 3005436 | A1 * | 11/2014 | ............ B41M 3/142 |
| JP | 52-6748 | B2 | 2/1977 | |
| JP | S6135284 | A * | 2/1986 | |
| JP | 2-19155 | B2 | 4/1990 | |
| JP | H07309090 | A * | 11/1995 | |
| JP | H8127181 | A * | 5/1996 | |
| JP | H08142512 | A * | 6/1996 | |
| JP | H08300539 | A * | 11/1996 | |
| JP | 11-248552 | A | 9/1999 | |
| JP | 2000-131152 | A | 5/2000 | |
| JP | 2002-37420 | A | 2/2002 | |
| JP | 2002248862 | A * | 9/2002 | |
| JP | 2004291469 | A * | 10/2004 | |
| JP | 2009229574 | A * | 10/2009 | |
| JP | WO2018097021 | A1 * | 10/2019 | |
| WO | WO-9728228 | A1 * | 8/1997 | .......... B41M 5/3377 |
| WO | WO-02096665 | A1 * | 12/2002 | ................ B41J 2/32 |
| WO | WO-2014178373 | A1 * | 11/2014 | ............ B43K 19/00 |
| WO | WO 2017/038292 | A1 | 3/2017 | |
| WO | WO-2017159040 | A1 * | 9/2017 | ............. G01K 11/06 |
| WO | WO-2018193781 | A1 * | 10/2018 | ............... C09B 9/00 |

OTHER PUBLICATIONS

U.S. Appl. No. 16/606,073, filed Oct. 30, 2023_JP_WO2018097021_A1_H.pdf,Oct. 2019.*
U.S. Appl. No. 16/606,073, filed Oct. 30, 2023_WO_2014178373_A1_H.pdf,Nov. 2014.*
U.S. Appl. No. 16/606,073, filed Oct. 30, 2023_WO_9728228_A1_H.pdf,Aug. 1997.*
Supplementary European Search Report issued in European Application No. 18788085.1 dated Nov. 25, 2020 (10 pages).
International Search Report (PCT/ISA/210) issued in PCT Application No. PCT/JP2018/011225 dated Jun. 26, 2018 with English translation (five (5) pages).
Japanese-language Written Opinion (PCT/ISA/237) issued in PCT Application No. PCT/JP2018/011225 dated Jun. 26, 2018 (five (5) pages).

* cited by examiner

First Temperature Indicating Material A, Ax

Temperature Indicating Material B, Bx

First Temperature Indicating Material

Second Temperature Indicating Material

First Temperature Indicating Material

Second Temperature Indicating Material

First Temperature Indicating Material

Second Temperature Indicating Material

Third Temperature Indicating Material

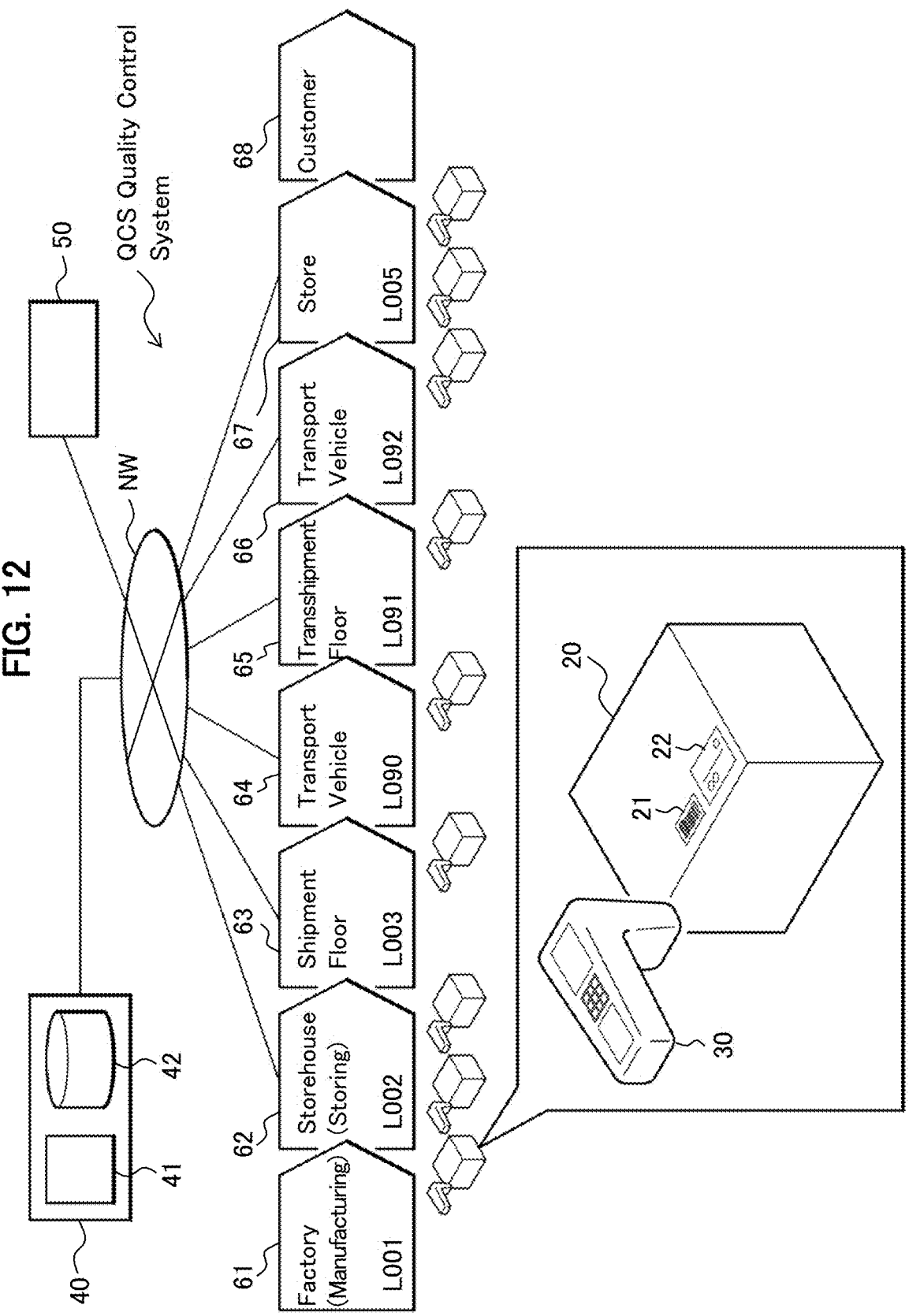

FIG. 14

| code | Product Name | Production Date (yy.mm.dd) | Distribution Deadline Date (yy.mm.dd) | Size (W×D×H) | Price (¥) | Surface Color Tone (L*a*b*) | Necessity of Temperature Control | Proper Temperature | Making Location |
|---|---|---|---|---|---|---|---|---|---|
| 4512345678906 | AA1 | 16.12.01 | 17.12.01 | 200×150×300 | 3,000 | 32.8, −5.0, 0.5 | Yes | 2~10°C | Beside Bar-Code |
| 4512345678913 | BB1 | 16.11.06 | 17.09.06 | 350×200×500 | 7,500 | 10.5, 10.3, −20.2 | Yes | 0~20°C | External Top Surface |
| 4512345678920 | CC1 | 16.11.28 | 17.05.28 | 200×200×300 | 2,500 | 86.2, 0.2, 0.3 | No | | |
| 4512345678937 | DD1 | 16.12.01 | 17.01.31 | 210×240×500 | 1,230 | 53.4, −15.3, 2.2 | Yes | ≦8°C | Not Specified |
| 4512345678944 | DD2 | 16.11.01 | 17.12.31 | 210×240×500 | 1,230 | 53.4, −15.3, 2.2 | Yes | ≦8°C | Not Specified |
| 4512345678951 | EE1 | 16.11.23 | 17.11.23 | 120×150×200 | 1,000 | 34.5, 0.5, 10.5 | Yes | ≧15°C | Beside Bar-Code |

421

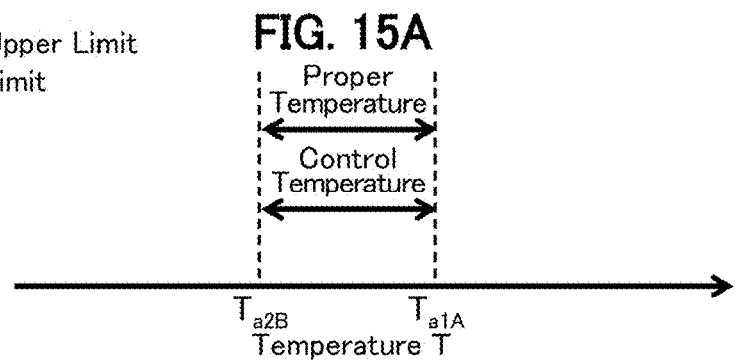
FIG. 15A Control by One Upper Limit and One Lower Limit
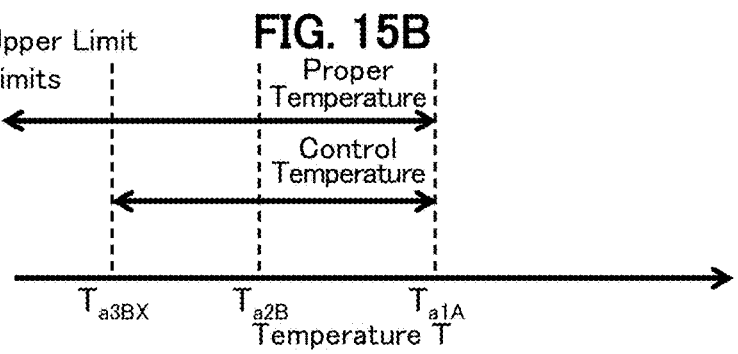
FIG. 15B Control by One Upper Limit and Two Lower Limits
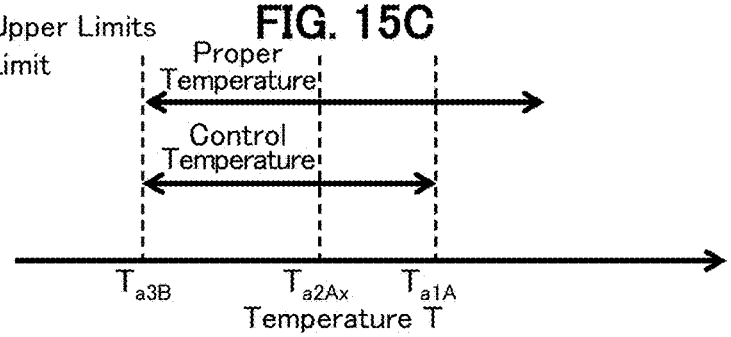
FIG. 15C Control by Two Upper Limits and One Lower Limit
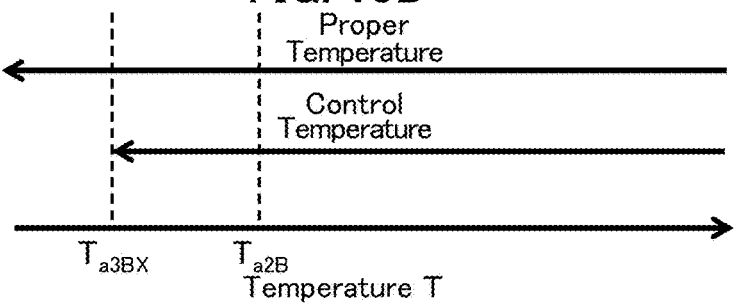
FIG. 15D Control by Two Lower Limits
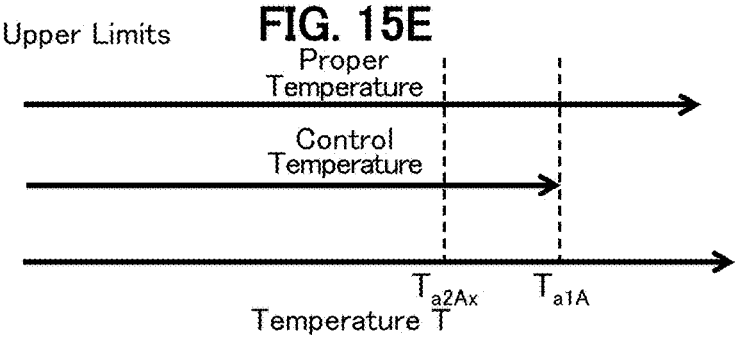
FIG. 15E Control by Two Upper Limits

| Code | Proper Temperature | First Determination | Second Determination | Third Determination | Comments |
|---|---|---|---|---|---|
| 4512345678906 | 2~10°C | 2°C | 5°C | 10°C | Control by One Upper Limit and Two Lower Limits |
| 4512345678913 | 0~20°C | 0°C | 15°C | 20°C | Control by Two Upper Limits and One Lower Limit |
| 4512345678937 | ≦8°C | - | 2°C | 7°C | Control by Two Upper Limits |
| 4512345678944 | ≦8°C | - | 2°C | 7°C | Control by Two Upper Limits |
| 4512345678951 | ≧15°C | 16°C | 21°C | - | Control by Two Lower Limits |
| ⋮ | ⋮ | ⋮ | ⋮ | ⋮ | ⋮ |

FIG. 19

| Code | Acquiring Time | Acquiring Location | First Determination Result | Second Determination Result | Third Determination Result | Overall Determination |
|---|---|---|---|---|---|---|
| 4512345678906 | 2016/12/01 15:00 | L001 | OK | OK | OK | OK |
| 4512345678906 | 2016/12/10 9:00 | L002 | OK | OK | OK | OK |
| 4512345678906 | 2016/12/17 9:00 | L002 | OK | OK | OK | OK |
| 4512345678906 | 2016/12/18 9:00 | L003 | OK | OK | OK | OK |
| 4512345678906 | 2016/12/18 17:00 | L090 | OK | OK | OK | OK |
| 4512345678906 | 2016/12/20 18:00 | L091 | OK | OK | OK | OK |
| 4512345678906 | 2016/12/21 15:00 | L092 | OK | OK | OK | OK |
| 4512345678906 | 2016/12/28 9:00 | L005 | OK | OK | OK | OK |
| ... | ... | ... | ... | ... | ... | ... |

| Code | Acquiring Time | Acquiring Location | First Determination Result | Second Determination Result | Third Determination Result | Overall Determination |
|---|---|---|---|---|---|---|
| 4512345678906 | 2016/12/01 15:00 | L001 | OK | OK | OK | OK |
| 4512345678906 | 2016/12/10 9:00 | L002 | OK | OK | OK | OK |
| 4512345678906 | 2016/12/17 9:00 | L002 | OK | OK | OK | OK |
| 4512345678906 | 2016/12/18 9:00 | L003 | OK | OK | OK | OK |
| 4512345678906 | 2016/12/18 17:00 | L090 | OK | NG | OK | Attention |
| 4512345678906 | 2016/12/18 18:00 | L091 | OK | NG | OK | Attention |
| 4512345678906 | 2016/12/20 15:00 | L092 | OK | OK | OK | ... |
| ... | ... | ... | ... | ... | ... | ... |

FIG. 20B

| Code | Acquiring Time | Acquiring Location | First Determination Result | Second Determination Result | Third Determination Result | Overall Determination |
|---|---|---|---|---|---|---|
| 4512345678906 | 2016/12/01 15:00 | L001 | OK | OK | OK | OK |
| 4512345678906 | 2016/12/10 9:00 | L002 | OK | OK | OK | OK |
| 4512345678906 | 2016/12/17 9:00 | L002 | OK | OK | OK | OK |
| 4512345678906 | 2016/12/18 9:00 | L003 | OK | OK | OK | OK |
| 4512345678906 | 2016/12/18 17:00 | L090 | OK | OK | OK | OK |
| 4512345678906 | 2016/12/18 18:00 | L091 | OK | OK | OK | OK |
| 4512345678906 | 2016/12/20 15:00 | L092 | OK | OK | OK | OK |
| 4512345678906 | 2016/12/21 9:00 | L005 | OK | OK | OK | OK |
| 4512345678906 | 2016/12/28 9:00 | L005 | OK | NG | NG | Stop |

FIG. 21

| Code | Acquiring Time | Acquiring Location | First Determination Result | Second Determination Result | Third Determination Result | Overall Determination |
|---|---|---|---|---|---|---|
| 4512345678906 | 2016/12/01 15:00 | L001 | OK | OK | OK | OK |
| 4512345678906 | 2016/12/10 9:00 | L002 | OK | OK | OK | OK |
| 4512345678906 | 2016/12/17 9:00 | L002 | OK | OK | OK | OK |
| 4512345678906 | 2016/12/18 9:00 | L003 | OK | OK | OK | OK |
| 4512345678906 | 2016/12/18 17:00 | L090 | OK | 10min | OK | Attention |
| 4512345678906 | 2016/12/18 18:00 | L091 | OK | 20min | OK | Attention |
| 4512345678906 | 2016/12/20 15:00 | L092 | OK | 40min | OK | Attention |
| 4512345678906 | 2016/12/21 9:00 | L005 | OK | 40min | OK | Attention |
| 4512345678906 | 2016/12/28 9:00 | L005 | OK | 50min | OK | Attention |
| ... | ... | ... | ... | ... | ... | ... |

426

TEMPERATURE DETECTING MATERIAL, TEMPERATURE DETECTING INK USING SAME, TEMPERATURE INDICATOR, AND PRODUCT CONTROL SYSTEM

TECHNICAL FIELD

The present invention relates to a temperature detecting material, a temperature detecting ink using same, a temperature indicator, and a product control system.

BACKGROUND ART

Fresh foods, chilled foods, and pharmaceutical products to be preserved at low temperature such as vaccines, biopharmaceuticals need a cold chain for continuously keeping them at a low temperature during the distribution processes in manufacture, transport, and consumption. Since, actually in many cases for continuously measuring and recording the temperature during distribution, generally, a data logger, by which time and temperature can be continuously recorded, is equipped in a transportation container, and thus, it is possible to clarify the responsibility when there occurs any damage in the products.

When a quality of individual product should be controlled, a method utilizing a temperature indicator in place of a data logger can be considered. Though the temperature indicator has not so high recording precision as the data logger, it can be attached to an individual product and is possible to know a change of ambient temperature, due to staining of its surface when the temperature becomes higher or lower than a temperature set in advance.

Patent literature 1 (PTL1) discloses a temperature indicating material, which utilizes a leuco dye for a temperature indicator enabling detection of temperature increase and temperature decrease, is disclosed.

Patent literature 2 (PTL2) discloses a temperature indicating material, which, in an ambient temperature, changes its color irreversibly between crystalline and non-crystalline states or between phase-separated and non-phase-separated states.

PATENT LITERATURE

Patent Literature 1 (PTL1): Japanese Examined Patent Publication No. H0219155B2
Patent Literature 2 (PTL2): Japanese Unexamined Patent Application Publication No. 2000131152A

SUMMARY OF INVENTION

Technical Problem

Since the temperature indicating material disclosed in PTL1 changes its color reversibly, tampering of the temperature indicator is possible and therefore it is hard to guarantee the temperature control during distribution.

Though the temperature indicating member disclosed in PTL2 is irreversible in an ambient temperature and is possible to initialize its function, it detects only temperature increase and cannot detect temperature decrease.

When it is assumed that a temperature indicator is attached to an individual product, for control of an expensive product such as a pharmaceutical product, there is a need to prevent tampering, and an absolute irreversibility is requested for the indicator after a temperature excursion. However, for control of inexpensive products such as fresh foods, based on cost consideration, it is sufficient if an irreversibility in an temperature at or below ambient temperature is provided, and, apart from the absolute irreversibility, there are more needs for reuse of the temperature indicators, for transportation in a normal temperature, and for storage in a normal temperature. Therefore, a function initialization in a considerably easy way is requested.

The present invention is an invention for solving the above problem, and the objective of the present invention is to provide a temperature detecting material of which function initialization is possible, a temperature detecting ink using the temperature detecting material, a temperature indicator, and a product control system.

Solution to Problem

In order to achieve the above objective, the present invention includes a first material containing a first temperature indicating material (for example, temperature indicating material A), a second material containing a second temperature indication material (for example, temperature indicating material A, temperature indicating material B), wherein the first temperature indicating material and the second temperature indicating material contain a leuco dye, a developing agent, and a decoloring agent, and have a hysteresis characteristic in a color density-temperature curve, wherein the first temperature indicating material has a color developing temperature $T_{a1}$ (for example, color developing temperature $T_{a1A}$) in a temperature increase process lower than the decoloring temperature $T_{d1}$ (for example, decoloring temperature $T_{d1A}$) in a temperature increase process, and can be kept in a decoloring state, and turns to a non-crystalline state when cooled down after melting to below the color developing temperature $T_{a1}$ in the temperature increase process with a cooling speed more than a predetermined cooling speed, wherein the second temperature indicating material has a color developing temperature $T_{a2}$ (for example, color developing temperature $T_{a2Ax}$, $T_{a2B}$) lower than a decoloring temperature $T_{d2}$ in a temperature increase process (for example, decoloring temperature $T_{d2Ax}$, $T_{d2B}$), and wherein the color developing temperature $T_{a2}$ is lower than the color developing temperature $T_{a1}$ in a temperature increase process. Regarding other aspects of the present invention are explained in the embodiments described later.

Advantageous Effects of Invention

According to the present invention, a detection material, which can detect a temperature increase and a temperature decrease and can initialize its function, can be provided.

BRIEF DESCRIPTION OF DRAWINGS

FIGS. 11A-11C show a diagram illustrating a manufacture of a temperature indicator and its verification result, wherein FIG. 11A shows a construction of a temperature indicator, FIG. 11B shows a substrate structure of the temperature indicator, and FIG. 11C shows the verification result.

FIG. 12 shows a configuration of a quality control system.

FIG. 14 shows a diagram illustrating product information stored in the control server.

FIGS. 15A-15E show a diagram illustrating a relationship between a proper temperature and a control temperature for a product, wherein FIG. 15A is for a case of a control by use of one upper limit and one lower limit, FIG. 15B is for a case of a control by use of one upper limit and two lower limits, FIG. 15C is for a case of a control by use of two upper limits and one lower limit, FIG. 15D is for a case of a control by use of two lower limits, and FIG. 15E is for a case of a control by use of two upper limits.

FIG. 16 shows a diagram illustrating temperature indicator information stored in the control server.

FIG. 19 shows an example, when distribution of the quality control information stored in the control server is normal.

FIGS. 20A-20B show an example, when distribution of the quality control information stored in the control server is not normal, wherein FIG. 20A is a case of "attention" call, and FIG. 20B is a case of "stop" call.

FIG. 21 shows a diagram illustrating other example of quality control information stored in the control server.

DESCRIPTION OF EMBODIMENTS

In the following, forms for implementing the present invention (hereinafter called as "embodiments") are explained in detail referring to figures as appropriate. It should be noted that, for the parts common to the figures, a same reference signs are respectively given, and a redundant explanation is omitted.

Explanations will be given about configurations of the temperature indicating materials of the present embodiments, referring to FIGS. 1A-5D. In the figures, first temperature indicating material, second temperature indicating material, and third temperature indicating material represent the first, the second, and the third temperature indicating materials, respectively, as below.

Temperature Indicating Material A, Ax:
   a material which solidifies in a non-crystalline state without being crystallized when it is rapidly cooled down, Temperature Indicating Material B, Bx:
   a material which solidifies in a non-crystalline state without being crystallized when it is rapidly cooled down.

The suffices of temperature T are given in the following meanings.
   a: color developing,
   b: decoloring,
   1, 2, 3: first, second, and third temperature indicating materials, respectively.

For example, $T_{a1A}$ represents a color developing temperature using the temperature indicating material A for the first temperature indicating material, and $T_{a2Ax}$ represents a color developing temperature using the temperature indicating material Ax for the second temperature indicating material.

<Temperature Indicating Material>

A temperature indicating material uses a material which changes its color density reversibly when the temperature changes (temperature increase/temperature decrease). The temperature indicating material contains a leuco dye, which is an electron-donating compound, a color developing agent, which is an electron-receiving compound, and a decoloring agent, which controls a temperature range of color change.

Figure 1A:
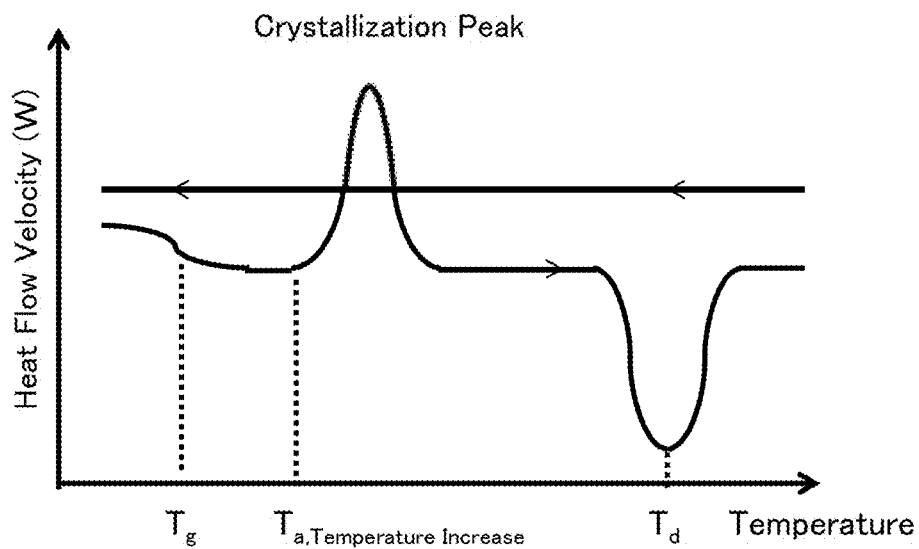
FIGS. 1A-1B show measurement curves of a difference scanning calorimetry for a temperature indicating material related to an embodiment, wherein FIG. 1A stands for the case that the temperature indicating material is A, Ax, and FIG. 1B stands for the case that the temperature indicating material is B, Bx.
Figure 1B:
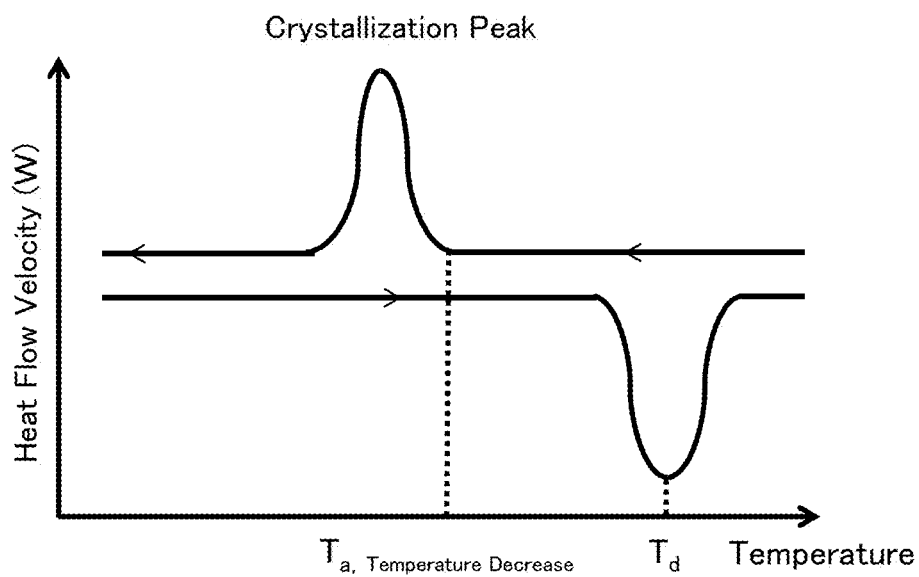

FIGS. 1A-1B show measurement curves of a difference scanning calorimetry (DSC) for a temperature indicating material related to an embodiment, wherein FIG. 1A stands for the case that the temperature indicating material is A, Ax, and FIG. 1B stands for the case that the temperature indicating material is B, Bx. Referring to FIGS. 1A-1B, a crystallization starting temperatures of the temperature indicating material A, Ax and the temperature indicating material B, Bx will be explained.

FIG. 1A shows a DSC curve of a material (temperature indicating material A, Ax) which solidifies in a non-crystalline state when it is rapidly cooled down. Since, no crystallization occurs in the temperature decrease process (indicated with a left-handed arrow (←) in the figure), no heat generation peak due to crystallization is observed. On the other hand, in the temperature increase process (indicated with a right-handed arrow (→) in the figure), a heat generation peak is observed. $T_{a,\ Temperature\ Increase}$ is a starting temperature in the temperature increase process (crystallization starting temperature in the temperature increase process). $T_d$ is a melting point.

The starting temperature depends on a temperature increase speed and on an elapsed time. When the temperature increase is done with a lower speed, the starting temperature appears at a lower temperature, or the starting temperature does not appear, and melting occurs at the melting point $T_d$. Since color developing occurs when the crystallization occurs, the starting temperature is set according to requirements for detection temperature and detection time of the temperature detecting material. For example, if the temperature indicating material is such that the crystallization starts after elapsing 1 hour at a temperature, then it is possible to use this as a material which detects that 1 hour has elapsed at the starting temperature. Further, $T_g$ is a glass-transition point. Below the glass-transition point, the crystallization does not start. In a case of a material which is likely to crystallize, since it is easily crystallized at a temperature higher than or equal to the glass-transition point, the starting temperature and the glass-transition point are often the same temperature.

FIG. 1B shows a DSC curve of a material (temperature indicating material B, Bx) which turns to a liquid in a supercooled state when cooled down after melting. $T_{a,\ Decreasing\ Temperature}$ is a starting temperature of a heat generation peak due to crystallization in the temperature decrease process (crystallization starting temperature in the temperature decrease process). $T_d$ is a melting point. The starting point depends on a temperature decrease speed and on an elapsed time. When the temperature decrease is done with a lower speed, the starting temperature appears at a higher temperature, and when the temperature decrease is done with a higher speed, the starting temperature appears at a lower temperature. Since the color developing occurs when the crystallization occurs, the starting temperature is set according to requirements for detection temperature and detection time of the temperature detecting material. For example, if the temperature indicating material is such that the crystallization starts after elapsing 1 hour at a temperature, then it is possible to use as a material which detects that 1 hour has elapsed at the starting temperature. In a case of a material which is not likely to be in a supercooled state, since it is easily crystallized at a temperature lower than or equal to the melting point, the starting temperature and the melting point are often the same temperature. Namely, a material, which is likely to be in a supercooled state and has a large difference between the crystallization starting point and the melting point, is preferred.

In the following, explanations are given to a detection material by which a temperature increase and a temperature decrease can be detected, and an initialization of function is possible.

Working Example 1

Figure 2A:
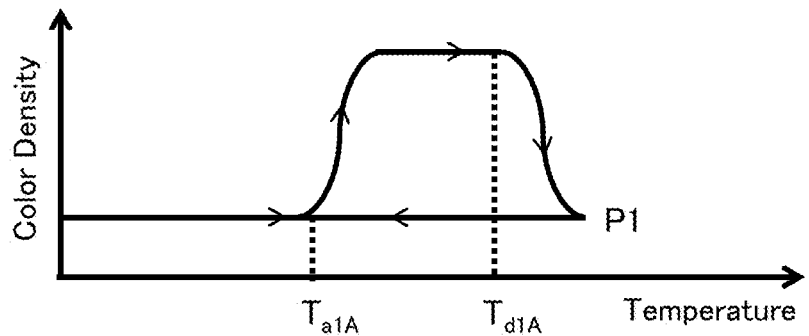
FIGS. 2A-2C show a color density change of a temperature detecting material of first working example, wherein FIG. 2A stands for the case of a first temperature indicating material A, FIG. 2B stands for the case of a second temperature indicating material B, and FIG. 2C stands for the case of combination of FIG. 2A and FIG. 2B.
Figure 2B:
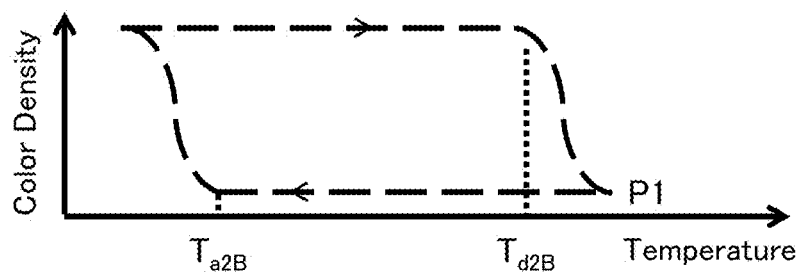
Figure 2C:
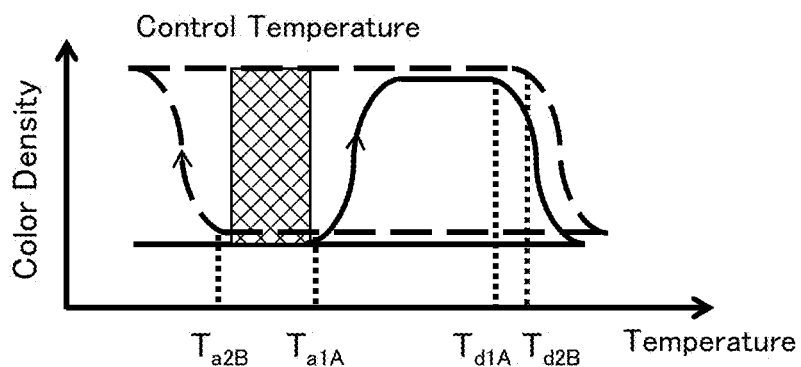

FIGS. 2A-2C show a color density change of a temperature detecting material of the first working example, wherein FIG. 2A stands for the case of a first temperature indicating material A, FIG. 2B stands for the case of a second temperature indicating material B, and FIG. 2C stands for the case of combination of FIG. 2A and FIG. 2B. In the respective figures of FIGS. 2A-2C, the vertical axis represents the color density and the horizontal axis represents the temperature.

FIG. 2A is for a case that a temperature indicating material A is used as the first temperature indicating material (first temperature indicating material A), wherein the first temperature indicating material A has a hysteresis characteristic in its color density change. If, the first temperature indicating material A uses a material as a decoloring agent which is not likely to be crystallized, the decoloring agent can form a non-crystalline state where the color developing agent is captured and the decoloring state is kept. In this state, when temperature is increased above the color developing temperature $T_{a1A}$, the decoloring agent is crystallized, and color develops.

FIG. 2B is for a case that a temperature indicating material B is used as the second temperature indicating material (second temperature indicating material B), wherein the second temperature indicating material B has a hysteresis characteristic in its color density change. The second temperature indicating material B keeps its decoloring state until the color developing temperature $T_{a2B}$, when temperature is decreased from a state P1 which is a melted state above the decoloring temperature $T_{d2B}$. When temperature is decreased below the color developing temperature $T_{a2B}$, the decoloring agent turns to a crystalline state at or below a solidifying point, then the leuco dye and the color developing agent are separated, by which the leuco dye and the color developing agent are combined, and color develops.

The purpose of the present working example is to guarantee a temperature control of a product during distribution. When a temperature detecting material, which changes its color reversibly according to temperature change, even though the color has once changed due to a temperature increase and a temperature decrease during distribution process, the color changes to its previous state, which prevents knowing whether there was a temperature change or not. However, when a material which shows a color change phenomenon as illustrated in FIG. 2A and FIG. 2B, since this material is not likely to return to its previous color, it is possible to know a change in the temperature environment.

FIG. 2C is a diagram showing a color density change of a temperature detecting material related to the working example 1. In FIG. 2C, the vertical axis represents the color density and the horizontal axis represents the temperature, $T_{a1A}$ is the color developing temperature of the first temperature indicating material A, $T_{d1A}$ is the decoloring temperature of the first temperature indicating material A, $T_{a2B}$ is the color developing temperature of the second color indicating material B, and $T_{d2B}$ is the decoloring temperature of the second temperature indicating material B, wherein the cross-hatched portion represents a range of temperature control of a product. By adjusting a color changing range of these two kinds of temperature indicating materials, the first temperature indicating material A and the second temperature indicating material B, it is possible to detect the presence of a change in the temperature environment. The combination of these two kinds of temperature indicating materials makes it possible to detect both a temperature increase and a temperature decrease. Further, it is possible to return the state that the color has once changed to the initial decoloring state. Therefore, a combination can be obtained, which provides an irreversibility below the melting points of these two materials, enables detection of a temperature excursion at the upper limit and the lower limit, and enables initialization of function by rapidly cooling down to a control temperature after heating to a temperature higher than or equal to the melting point.

Working Example 2

Figure 3A:
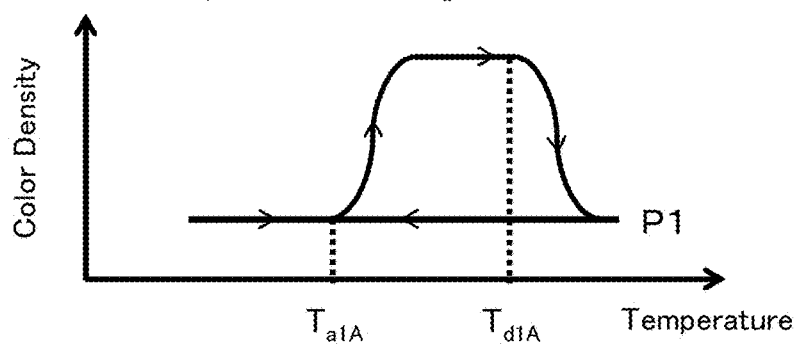
FIGS. 3A-3C show a color density change of a temperature detecting material of second working example, wherein FIG. 3A stands for the case of a first temperature indicating material A, FIG. 3B stands for the case of a second temperature indicating material Ax, and FIG. 3C stands for the case of combination of FIG. 3A and FIG. 3B.
Figure 3B:
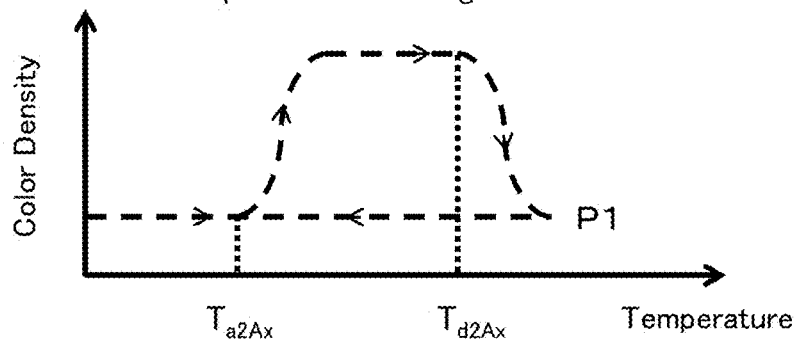
Figure 3C:
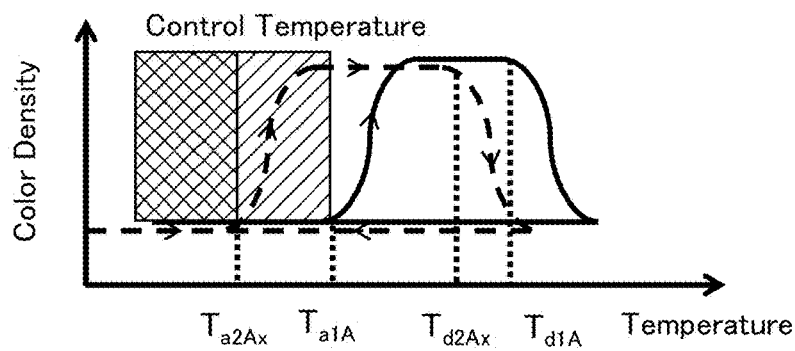

FIGS. 3A-3C show a color density change of a temperature detecting material of the second working example, wherein FIG. 3A stands for the case of a first temperature indicating material A, FIG. 3B stands for the case of a second temperature indicating material Ax, and FIG. 3C stands for the case of combination of FIG. 3A and FIG. 3B.

In FIGS. 3A-3C, the vertical axis represents the color density and the horizontal axis represents the temperature.

FIG. 3A, similar to FIG. 2A, is for a case that a temperature indicating material A is used as the first temperature indicating material (first temperature indicating material A), wherein the first temperature indicating material A has a hysteresis characteristic in its color density change. The first temperature indicating material A can keep the decoloring state, since the decoloring agent can form a non-crystalline state where the color developing agent is captured and the decoloring state is kept, when it is rapidly cooled down from P1, a melting state at higher than or equal to the decoloring temperature $T_{d1A}$ of the first temperature indicating material, to a temperature lower than or equal to the color developing temperature $T_{a1A}$. In this state, when temperature is increased higher than or equal to the color developing temperature $T_{a1A}$ in a temperature increase process, the decoloring agent is crystallized, and color develops.

FIG. 3B is for a case that a temperature indicating material Ax is used as the second temperature indicating material (second temperature indicating material Ax), wherein the second temperature indicating material Ax has a hysteresis characteristic in its color density change. The second temperature indicating material Ax can keep the decoloring state, since the decoloring agent can form a non-crystalline state where the color developing agent is captured, when it is rapidly cooled down from P1, a melting state at higher than or equal to the decoloring temperature $T_{d2Ax}$ of the second temperature indicating material, to a temperature lower than or equal to the color developing temperature $T_{a2Ax}$. In this state, when temperature is increased higher than or equal to the color developing temperature $T_{a2Ax}$ in a temperature increase process, the decoloring agent is crystallized, and color develops.

FIG. 3C is a diagram showing a color density change of a temperature detecting material related to the working example 2. In FIG. 3C, the vertical axis represents the color density and the horizontal axis represents the temperature, $T_{a1A}$ is the color developing temperature of the first temperature indicating material A, $T_{d1A}$ is the decoloring temperature of the first temperature indicating material A, $T_{a2AX}$ is the color developing temperature of the second color indicating material Ax, and $T_{d2Ax}$ is the decoloring temperature of the second temperature indicating material Ax, wherein the cross-hatched portion and the hatched portion represent a range of temperature control of a product. By adjusting color developing temperatures of these two kinds of temperature indicating materials, the first temperature indicating material A and the second temperature indicating material Ax, it is possible to detect a plurality of temperatures in a temperature increase process.

Figure 4:
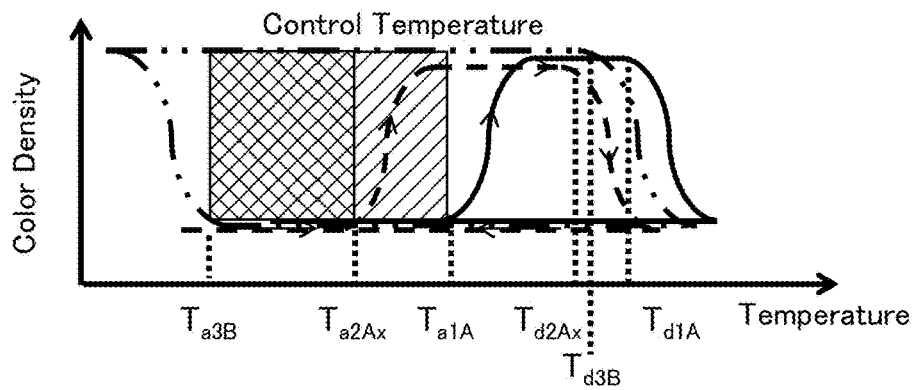
FIG. 4 shows a color density change of a temperature detecting material for the case of combination of FIGS. 3A-3C and a third temperature indicating material B.

FIG. 4 shows a color density change of a temperature detecting material for the case of combination of FIG. 3C and a third temperature indicating material B. In FIG. 4, the vertical axis represents the color density and the horizontal axis represents the temperature, $T_{a1A}$ is the color developing temperature of the first temperature indicating material A, $T_{d1A}$ is the decoloring temperature of the first temperature indicating material A, $T_{a2Ax}$ is the color developing temperature of the second color indicating material Ax, and $T_{d2Ax}$ is the decoloring temperature of the second temperature indicating material Ax, $T_{a3B}$ is the color developing temperature of the third color indicating material B, and $T_{d3B}$ is the decoloring temperature of the third temperature indicating material B, wherein the cross-hatched portion and the hatched portion represent a range of temperature control of a product.

By adjusting the color change ranges of the second temperature indicating material Ax and the third temperature indicating material B among these three kinds of temperature indicating materials, it is possible to detect whether a change in the temperature environment exists or not, and further it is possible to detect a plurality of temperatures on the temperature increase process.

Working Example 3

Figure 5A:
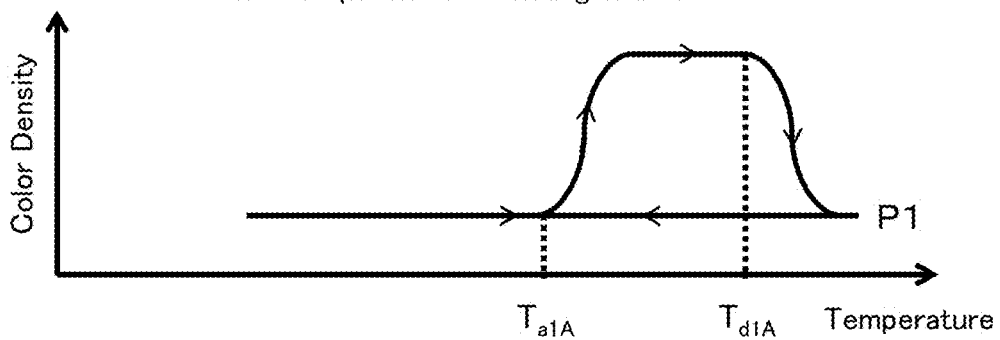
FIGS. 5A-5D show a color density change of a temperature detecting material of third working example, wherein FIG. 5A stands for the case of a first temperature indicating material A, FIG. 5B stands for the case of a second temperature indicating material B, and FIG. 5C stands for the case of third temperature indicating material Bx, and FIG. 5D stands for the combination of FIG. 5A, FIG. 5B and FIG. 5C.
Figure 5B:
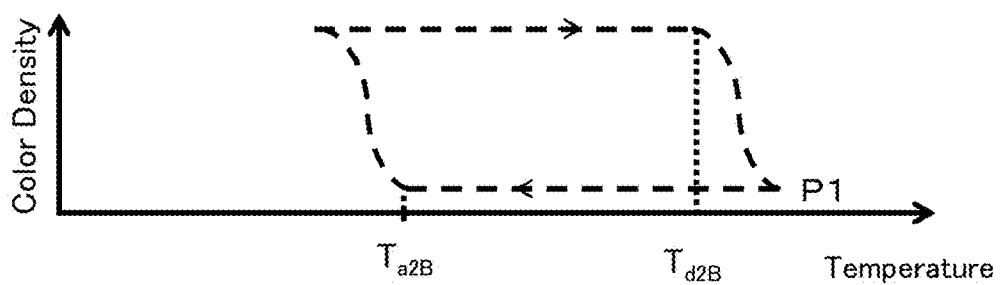
Figure 5C:
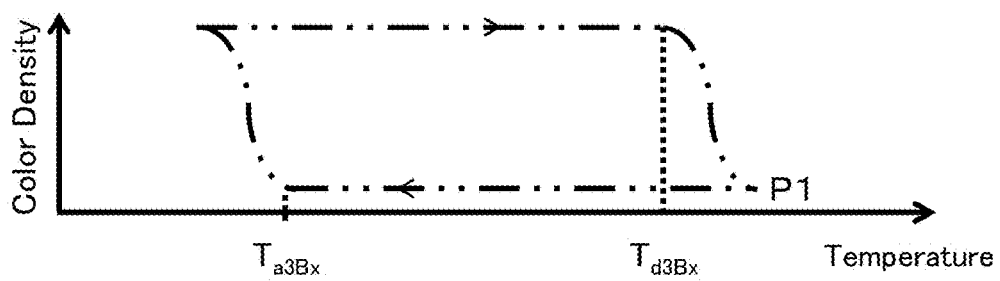
Figure 5D:
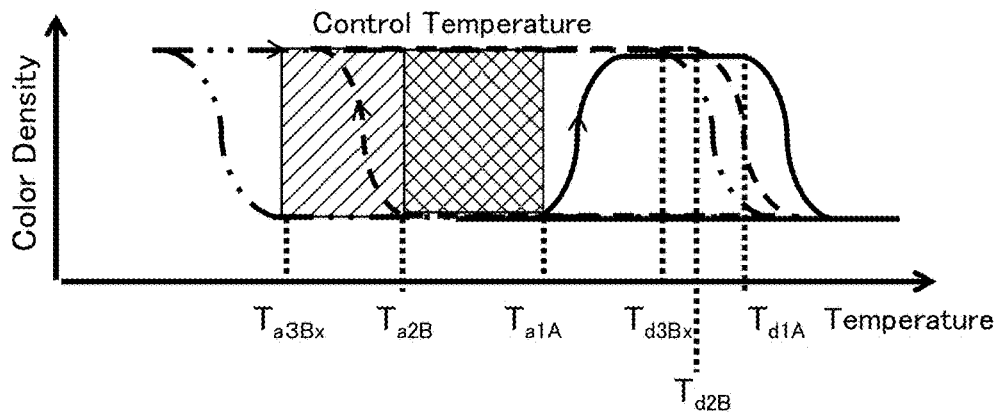

FIGS. 5A-5D show a color density change of a temperature detecting material of third working example, wherein FIG. 5A stands for the case of a first temperature indicating material A, FIG. 5B stands for the case of a second temperature indicating material B, and FIG. 5C stands for the case of third temperature indicating material Bx, and FIG. 5D stands for the combination of FIG. 5A, FIG. 5B and FIG. 5C.

FIG. 5A, similar to the working example 1, is for a case that a temperature indicating material A is used as the first temperature indicating material (first temperature indicating material A), wherein the first temperature indicating material A has a hysteresis characteristic in its color density change. The first temperature indicating material A can keep the decoloring state, since the decoloring agent can form a non-crystalline state where the color developing agent is captured, when it is rapidly cooled down from P1, a melted state at higher than or equal to the decoloring temperature $T_{d1A}$ of the first temperature indicating material, to a temperature lower than or equal to the color developing temperature $T_{a1A}$. In this state, when temperature is increased higher than or equal to the color developing temperature $T_{a1A}$ in a temperature increase process, the decoloring agent is crystallized, and color develops.

FIG. 5B, similar to the working example 1, is for a case that a temperature indicating material B is used as the second temperature indicating material (second temperature indicating material B), wherein the second temperature indicating material B has a hysteresis characteristic in its color density change. The second temperature indicating material B keeps its decoloring state until the color developing temperature $T_{a2B}$, when temperature is decreased from a state P1 which is a melted state at higher than or equal to the decoloring temperature $T_{d2B}$. When temperature is decreased below the color developing temperature $T_{a2B}$, the decoloring agent turns to a crystalline state at or below a solidifying point, then the leuco dye and the color developing agent are separated, by which the leuco dye and the color developing agent are combined, and color develops.

FIG. 5C, is for a case that a temperature indicating material Bx is used as the third temperature indicating material (third temperature indicating material Bx), wherein the third temperature indicating material Bx has a hysteresis characteristic in its color density change. The third temperature indicating material Bx has a hysteresis characteristic similar to the second temperature indicating material B and keeps its decoloring state until the color developing temperature $T_{a3BX}$, when temperature is decreased from a state P1, a melted state higher than or equal to the decoloring temperature $T_{a3BX}$. When temperature is decreased lower than or equal to the color developing temperature $T_{a3BX}$, the decoloring agent turns to a crystalline state at or below a solidifying point, then the leuco dye and the color developing agent are separated, by which the leuco dye and the color developing agent are combined, and color develops.

FIG. 5D shows a color density change of a temperature detecting material related to the working example 3. In FIG.

5D, the vertical axis represents the color density and the horizontal axis represents the temperature, $T_{a1A}$ is the color developing temperature of the first temperature indicating material A, $T_{d1A}$ is the decoloring temperature of the first temperature indicating material A, $T_{a2B}$ is the color developing temperature of the second color indicating material B, $T_{d2B}$ is the decoloring temperature of the second temperature indicating material B, $T_{a3BX}$ is the color developing temperature of the third color indicating material Bx, and $T_{d3Bx}$ is the decoloring temperature of the third temperature indicating material Bx, wherein the cross-hatched portion and the hatched portion represent a range of temperature control of a product. By adjusting the color change ranges of the first temperature indicating material A and the second temperature indicating material B among these three kinds of temperature indicating materials, it is possible to detect whether a change in the temperature environment exists or not, and further it is possible to detect a plurality of temperatures in the temperature decrease process.

The above working examples can be summarized as below.

The temperature detecting material according to the present embodiment includes a first material containing a first temperature indicating material and a second material containing a second temperature indicating material, wherein the first temperature indicating material and the second temperature indicating material each contain a leuco dye, a color developing agent, and a decoloring agent, and have a hysteresis characteristic in their color density-temperature curves. The first temperature indicating material has a color developing temperature $T_{a1}$ (for example $T_{a1A}$) in a temperature increase process, which is lower than a decoloring temperature $T_{d1}$ (for example $T_{d1A}$) in the temperature increase process, and turns to a non-crystalline state and is kept in a decoloring state when cooled down lower than the color developing temperature $T_{a1}$ in the temperature increase process with a predetermined cooling speed or more after melting, and the second temperature indicating material has a color developing temperature $T_{a2}$ in a temperature increase process (for example $T_{a2B}$, $T_{a2Ax}$), which is lower than a decoloring temperature $T_{d2}$ (for example $T_{d2B}$, $T_{d2Ax}$) in a temperature increase process, wherein the color developing temperature $T_{a1}$ in the temperature increase process is lower than the decoloring temperature $T_{d2}$ in the temperature increase process and the color developing temperature $T_{a2}$ is lower than the color developing temperature $T_{a1}$ in the temperature increase process.

In FIG. 2, the color developing temperature $T_{a2}$ (for example $T_{a2B}$) of the second temperature indicating material is a color developing temperature in a temperature decrease process, and the second temperature indicating material turns to a liquid state and is kept in a decoloring state when cooled down after melting to a temperature higher than the color developing temperature $T_{a2}$ and lower than the color developing temperature $T_{a1}$ in a temperature increase process of the first temperature indicating material.

In FIG. 3, the color developing temperature $T_{a2}$ of the second temperature indicating material (for example $T_{a2Ax}$) is a color developing temperature in a temperature increase process, and the second temperature indicating material turns to a non-crystalline state and is kept in a decoloring state when cooled down to lower than the color developing temperature $T_{a2}$ with a predetermined cooling speed or more.

In FIGS. 4, 5A-5D, the temperature detecting material according to the present embodiment further contains a third material containing a third temperature indicating material, wherein the third temperature indicating material contains a leuco dye, a color developing agent and a decoloring agent, and has a color density-temperature curve of a hysteresis characteristic, wherein the color developing temperature $T_{a3}$ (for example $T_{a3B}$, $T_{a3Bx}$) in a temperature decrease process is lower than the decoloring temperature $T_{d3}$ in a temperature increase process, wherein the third temperature indicating material turns to a liquid state and is kept in a decoloring state when cooled down after melting to lower than the color developing temperature $T_{a1}$ and higher than the color developing temperature $T_{a3}$, and wherein the first temperature indicating material, the second temperature indicating material, and the third temperature indicating material have a relation $T_{a3} < T_{a2} < T_{a1}$, $T_{a1} \rightarrow T_{d1}$, $T_{a1} < T_{d2}$, $T_{a1} < T_{d3}$.

In the following, the leuco dye, the color developing agent, and the decoloring agent in respective temperature indicating materials are explained.

(Leuco Dye)

The leuco dye is an electron-donating compound, for which a known dye used conventionally as a dye for a pressure-sensitive copying paper or a thermosensitive recording paper can be utilized. For example, triphenylmethanephthalide, fluorane, phenothiazine, indolylphthalide, leucoauramine, spiropyran, rhodamine lactam, triphenylmethane, triazene, spirophthalan xanthene, naphtholactam and azomethine leuco dyes can be considered. As specific examples of the leuco dye, 9-(N-ethyl-N-isopentylamino)spiro[benzo[a]xanthene-12,3'-phthalide], 2-methyl-6-(N-p-tolyl-N-ethylamino)-fluorane 6-(diethylamino)-2-[(3-trifluoromethyl)anilino]xanthene-9-spiro-3'-phthalide, 3,3-bis(p-diethylaminophenyl)-6-dimethylaminophthalide, 2'-anilino-6'-(dibutylamino)-3'-methylspiro[phthalide-3,9'-xanthene], 3-(4-diethylamino-2-methylphenyl)-3-(1-ethyl-2-methylindol-3-yl)-4-azaphthalide and 1-ethyl-8-[N-ethyl-N-(4-methylphenyl)amino]-2,2,4-trimethyl-1,2-dihydrospiro[11H-chrome no[2,3-g]quinoline-11,3'-phthalide can be considered.

A temperature indicating material, in which more than two kinds of leuco dyes are combined, can also be used.

(Color Developing Agent)

The color developing agent changes the structure of the leuco dye to cause coloring by contacting with an electron-donating leuco dye. As the color developing agent, known color developing agents used for thermosensitive recording paper, pressure sensitive copying paper and the like can be utilized. As specific examples of the color developing agent, phenols such as benzyl 4-hydroxybenzoate, 2,2'-biphenol, 1,1-bis(3-cyclohexyl-4-hydroxyphenyl)cyclohexane, 2,2-bis(3-cyclohexyl-4-hydroxyphenyl)propane, bisphenol A, bisphenol F, bis(4-hydroxyphenyl)sulfide, para-hydroxybenzonate and gallic acid esters can be considered. The color developing agent is not limited to these and can be any compound as long as it is an electron acceptor and can change the color of the leuco dye. Also, metal salts of carboxylic acid derivatives, salicylic acid and salicylic acid metal salts, sulfonic acids, sulfonates, phosphoric acids, phosphate metal salts, acidic phosphate esters, acidic phosphate ester metal salts, phosphorous acids, metal phosphate and the like can be used. Specifically, a color developing agent having high compatibility with the leuco dye and with the decoloring agent mentioned below are preferable, and organic color developing agents such as Benzyl 4-hydroxybenzoate, 2,2'-bisphenol, bisphenol A and gallic acid esters are preferable.

For the temperature indicating material related to the present invention, one kind or a combination of two or more kinds of these color developing agents can be used, and the color density during color developing of the leuco dye can be adjusted by combining the color developing agents. The used amount of the color developing agent is selected depending on the desired color density. For example, the used amount can be generally selected in the weight ratio range of about 0.1 to 100 against the above-mentioned leuco pigment with weight ratio 1.

(Decoloring Agent)

The decoloring agent is a compound that can solve the binding of the leuco dye and the color developing agent and is a compound that can control the color developing temperatures of the leuco dye and the color developing agent. Generally, in the temperature range at which the leuco dye is in a color developing state, the decoloring agent is solidified in a phase-separated state. Furthermore, in the temperature range at which the leuco dye is in a decoloring state, the decoloring agent is melted and is in a state that a function to solve the binding between the leuco dye and the color developing agent is exerted. Therefore, the state change temperature of the decoloring agent becomes important for the temperature control of the temperature indicating material.

As a material of the decoloring agent, a compound that can solve the binding of the leuco dye and the color developing agent can be widely used. If the polarity is low and does not show a color developing characteristic with respect to the leuco dye and if the polarity is sufficiently high to dissolve the leuco dye and the color developing agent, various materials can be used as the decoloring agent. Typically as a decoloring agent, various organic compounds such as hydroxy compound, ester compound, peroxy compound, carbonyl compound, aromatic compound, aliphatic compound, halogen compound, amino compound, imino compound, N-oxide compound, hydroxyamine compound, nitro compound, azo compound, diazo compound, azide, ether compounds, fat compounds, sugar compounds, peptide compounds, nucleic acid compounds, alkaloid compounds, steroid compounds can be used. Specifically, ester compounds such as tricaprin, isopropyl myristate, m-tolyl acetate, diethyl sebacate, dimethyl adipate, 1,4-diacetoxybutane, decyl decanoate, diethyl phenylmalonate, diisobutyl phthalate, triethyl citrate, benzyl butyl phthalate, butyl phthalyl butyl glycolate, methyl N-methylanthranylate, ethyl anthranilate, 2-hydroxyethyl salicylate, methyl nicotinate, butyl 4-aminobenzoate, methyl p-toluate, 4-nitrobenzoate ethyl acetate, 2-phenylethyl phenylacetate, benzyl cinnamate, methyl acetoacetate, geranyl acetate, dimethyl succinate, dimethyl sebacate, diethyl oxalate, monoolein, butyl palmitate, ethyl stearate, methyl palmitate, methyl stearate, linalyl acetate, di-n-octyl phthalate, benzyl benzoate, diethylene glycol dibenzoate, methyl p-anisate, m-tolyl acetate, cinnamyl cinnamate, 2-phenylethyl propionate, butyl stearate, ethyl myristate, methyl myristate, methyl anthranilate, neryl acetate, isopropyl palmitate, ethyl 4-fluorobenzoate, cyclanderate (isomer mixture), butopyronoxyl, ethyl 2-bromopropionate, tricaprylin, ethyl levulinate, hexadecyl palmitate, tert-butyl acetate, 1,1-ethanediol diacetate, dimethyl oxalate, tristearin, methyl acetylsalicylate, benzaldiacetate, methyl 2-benzoylbenzoate, ethyl 2,3-dibromobutyrate, ethyl 2-furancarboxylate, ethyl acetopyruvate, ethyl vanillate, dimethyl itaconate, methyl 3-bromobenzoate, monoethyl adipate, dimethyl adipate, 1,4-diacetoxybutane, diethylene glycol diacetate, ethyl palmitate, diethyl terephthalate, phenyl propionate, phenyl stearate, 1-naphthyl acetate, methyl behenate, methyl arachidate, methyl 4-chlorobenzoate, methyl sorbate, ethyl isonicotiate, dimethyl dodecanedioate, methyl heptadecanoate, ethyl α-cyanocinnamate, N-phenylglycine ethyl, diethyl itaconate, methyl picolinate, methyl isonicotinate, DL-methyl mandelate, methyl 3-amino enzoate, methyl 4-methylsalicylate, diethyl benzylidenemalonate, DL-mandelate isoamyl, triethyl methanetricarboxylate, diethyl formaminomalonate, 1,2-bis (chloroacetoxy) ethane, methyl pentadecanoate, ethyl arachidate, ethyl 6-bromohexanoate, monoethyl pimelate, hexadecyl lactate, ethyl benzylate, mefenpyr-diethyl, procaine, dicyclohexyl phthalate, 4-tert-butylphenyl salicylate, isobutyl 4-aminobenzoate, butyl 4-hydroxybenzoate, tripalmitine, 1,2-diacetoxybenzene, dimethyl isophthalate, monoethyl fumarate, methyl vanillate, methyl 3-amino-2-thiophenecarboxylate, etomidate, croquintoset-mexyl, methyl benzylate, diphenyl phthalate, phenyl benzoate, propyl 4-aminobenzoate, ethylene glycol dibenzoate, triacetin, ethyl pentafluoropropionate, methyl 3-nitrobenzoate, 4-acetate nitrophenyl, methyl 3-hydroxy-2-naphthoate, trimethyl citrate, ethyl 3-hydroxybenzoate, methyl 3-hydroxybenzoate, trimebutine, 4-methoxybenzyl acetate, pentaerythritol tetraacetate, methyl 4-bromobenzoate, ethyl 1-naphthalene acetate, 5-nitro-2-furaldehyde diacetate, ethyl 4-aminobenzoate, propylparaben, 1 2,4-triacetoxybenzene, methyl 4-nitrobenzoate, diethyl acetamidomalonate, barretamate bromide, 2-naphthyl benzoate, dimethyl fumarate, adiphenine hydrochloride, benzyl 4-hydroxybenzoate, ethyl 4-hydroxybenzoate, vinyl butyrate, vitamin K4, methyl 4-iodobenzoate, methyl 3,3-dimethylacrylate, propyl gallate, 1,4-diacetoxy benzene, diethyl mesooxalate, dimethyl 1,4-cyclohexanedicarboxylate (cis-, trans-mixture), triethyl 1,1,2-ethanetricarboxylate, dimethyl hexafluoroglutarate, amyl benzoate, ethyl 3-bromobenzoate, ethyl 5-bromo-2-chlorobenzoate, bis (2-ethylhexyl) phthalate, diethyl allylmalonate, diethyl bromomalonate, diethyl ethoxymethylenemalonate, diethyl ethylmalonate, diethyl fumarate, diethyl maleate, diethyl malonate, diethyl phthalate, dimethyl 1,3-acetonedicarboxylate, dimethyl phthalate, ethyl 3-aminobenzoate, ethyl benzoate, ethyl 4-(dimethylamino) benzoate, ethyl nicotinate, ethyl phenylpropiolate, ethyl pyridine-2-carboxylate, ethyl 2-pyridyl acetate, ethyl 3-pyridyl acetate, methyl benzoate, ethyl phenylacetate, amyl 4-hydroxybenzoate, 2,5-diacetoxytoluene, ethyl 4-oxazol carboxylate, trimethyl 1,3,5-cyclohexanetricarboxylate (cis-, trans-mixture), methyl 3-(chlorosulfonyl)-2-thiophenecarboxylate, pentaerythritol distearate, benzyl laurate, diethyl acetylenedicarboxylate, phenyl methacrylate, benzyl acetate, dimethyl glutarate, ethyl 2-oxocyclohexanecarboxylate, phenylcyano ethyl acetate, ethyl 1-piperazinecarboxylate, methyl benzoylformate, methyl phenylacetate, phenyl acetate, diethyl succinate, tributyrin, diethyl methylmalonate, dimethyl oxalate, diethyl 1,1-cyclopropanedicarboxylate, dibenzyl malonate, methyl 4-tert-butylbenzoate, ethyl 2-oxocyclopentanecarboxylate, methyl cyclohexanecarboxylate, ethyl 4-methoxyphenyl acetate, methyl 4-fluorobenzoyl acetate, dimethyl maleate, methyl terephthalaldehyde, ethyl 4-bromobenzoate, methyl 2-bromobenzoate, methyl 2-iodobenzoate, ethyl 3-iodobenzoate, ethyl 3-furancarboxylate, diallyl phthalate, benzyl bromoacetate, dimethyl bromomalonate, methyl m-toluate, diethyl 1,3-acetonedicarboxylate, methyl phenylpropiolate, 1-naphthyl butyrate, ethyl o-toluate, methyl 2-oxocyclopentanecarboxylate, isobutyl benzoate, ethyl 3-phenylpropionate, di-tert-butyl malonate, dibutyl sebacate, diethyl adipate, diethyl terephthalate, dipropyl phthalate, 1,1-ethanediol diacetate, diisopropyl adipate, diisopropyl fumarate, ethyl cinnamate, 2-cyano-3,3-diphenyl acrylate 2-ethylhexyl, neopentyl glycol diacrylate, triolein, benzoyl ethyl acetate, ethyl p-anisate, diethyl suberate, sorbitan tristearate, sorbitan monostearate, stearamide, glycerol monostearate, glycerol distearate, 3-(tert-butoxycarbonyl) phenylboronic acid, racecadotril, 4-[(6-acryloyloxy) hexyloxy]-4'-cyanobiphenyl, 2-(dimethylamino) vinyl 3-pyridyl ketone, stearyl acrylate, ethyl 4-bromophenyl acetate, dibenzyl phthalate, methyl 3,5-dimethoxybenzoate, eugenol acetate, didodecyl 3,3'-thiodipropionate, vanillin acetate, diphenyl carbonate, ethyl oxanilate, methyl terephthalaldehyde, dimethyl 4-nitrophthalate, ethyl (4-nitrobenzoyl) acetate, dimethyl nitroterephthalate, methyl 2-methoxy-5-(methylsulfonyl) benzoate, methyl 3-methyl-4-nitrobenzoate, dimethyl 2,3-naphthalenedicarboxylate, bis (2-ethylhexyl) adipate, 4'-acetoxyacetophenone, ethyl trans-3-benzoylacrylate, ethyl coumarin-3-carboxylate, BAPTA tetraethyl ester, methyl 2,6-dimethoxybenzoate, di-tert-butyl iminodicarboxylate, benzyl p-benzyloxybenzoate, methyl 3,4,5-trimethoxybenzoate, methyl 3-amino-4-methoxybenzoate, diethylene glycol distearate, ditetradecyl 3,3'-thiodipropionate, ethyl 4-nitrophenyl acetate, methyl 4-chloro-3-nitrobenzoate, 1,4-dipropionyloxybenzene, dimethyl terephthalate, ethyl 4-nitrocinnamate, dimethyl 5-nitroisophthalate, triethyl 1,3,5-benzenetricarboxylate, diethyl N-(4-aminobenzoyl)-L-glutamate, 2-methyl-1-naphthyl acetate, 7-acetoxy-4-methylcoumarin, methyl 4-amino-2-methoxybenzoate, 4,4'-diacetoxybiphenyl, dimethyl 5-aminoisophthalate, diethyl 1,4-dihydro-2,6-dimethyl-3,5-pyridinedicarboxylate, dimethyl 4,4'-biphenyldicarboxylate, and steroid compounds such as cholesterol, cholesteryl bromide, β-estradiol, methylandrostenediol, pregnenolone, cholesterol benzoate, cholesterol acetate, cholesterol linoleate, cholesterol palmitate, cholesterol stearate, cholesterol n-octanoate, cholesterol oleate, 3-chlorocholestene, cholesterol trans-cinnamate, cholesterol decanoate, cholesterol hydrocinnamate, cholesterol laurate, cholesterol butyrate, cholesterol formate, cholesterol heptanoate, cholesterol hexanoate, cholesterol hydrogen succinate, cholesterol myristate, cholesterol propionate, cholesterol valerate, cholesterol hydrogen phthalate, cholesterol phenyl acetate, cholesterol chloroformate, cholesterol 2,4-dichlorobenzoate, cholesterol pelargonate, cholesterol nonyl carbonate, cholesterol heptyl carbonate, cholesterol oleyl carbonate, cholesterol methyl carbonate, cholesterol ethyl carbonate, cholesterol isopropyl carbonate, cholesterol butyl carbonate, cholesterol isobutyl carbonate, cholesterol amyl carbonate, cholesterol n-octyl carbonate, cholesterol hexyl carbonate, allylestrenol, altrenogest, 9(10)-dehydronandrolone, estrone, ethinyl estradiol, estriol, estradiol benzoate, β-estradiol 17-cypionate, β-estradiol 17-valerate, α-estradiol, β-estradiol 17-heptanate, gestrinone, mestranol, 2-methoxy-β-estradiol, nandrolone, (–)-norgestrel, quinestrol, trenbolone, tibolone, stanolone, androsterone, abiraterone, abiraterone acetate, dehydroepiandrosterone, dehydroepiandrosterone acetate, ethisterone, epiandrosterone, 17β-hydroxy-17-methylandrosta-1,4-dien-3-one, methylandrostenediol, methyltestosterone, Δ9 (11)-methyltestosterone, 1α-methylandrostan-17β-ol-3-one, 17α-methylandrostan-17β-ol-3-one, stanozolol, testosterone, testosterone propionate, altrenogest, 16-dehydropregnenolone acetate, 16,17-epoxypregnenolone acetate, 11α-hydroxyprogesterone, 17α-hydroxyprogesterone caproate, 17α-hydroxyprogesterone, pregnenolone acetate, 17α-hydroxyprogesterone acetate, megestrol acetate, medroxyprogesterone acetate, pregnenolone acetate, 5β-pregnane-3α, 20α-diol, budesonide, corticosterone, cortisone acetate, cortisone, cortexolone, deoxycorticosterone acetate, deflazacoat, hydrocortisone acetate, hydrocortisone, hydrocortisone 17-butyrate, 6α-methylprednisolone, prednisolone, prednisone, prednisolone acetate, sodium deoxycholate, sodium cholate, methyl cholate, methyl hyodeoxycholate, β-cholestanol, cholesterol-5α, 6α-epoxide, diosgenin, ergosterol, β-sitosterol, stigmasterol, β-sitosterol acetate can be considered. In light of compatibility between the leuco dye and the color developing agent, it is preferable to contain these compounds. As a matter of course, it is not limited to these compounds, and any material, which can dissociate the binding of the leuco dye and the color developing agent, can be used.

Further, one kind or a combination of two or more kinds of these decoloring agents can be used. By combination of these decoloring agents, it is possible to adjust the solidifying point and the melting point.

As a matter of course, the decoloring agent is not limited to the above compounds, and other compounds can be considered, for example. Important is the state changing temperature of the above decoloring agents, and what is requested for the decoloring agent of the temperature indicating material used to detect a upper limit temperature excursion is that the decoloring agent is not crystallized in a rapid cooling process, forming a non-crystalline state by rapid cooling at a temperature close to the glass transition point. Therefore, a material, which does not likely crystallize, is preferable. Though almost all materials form a non-crystalline state, when a very large cooling speed is used, it is preferable to use a material which does not likely form a crystalline state and forms a non-crystalline state in a rapid cooling by use of a generally used cooling apparatus, when a practicability is considered. More preferably, a material which does not likely crystallize and forms a non-crystalline state, when it is naturally cooled down from a melting state above the melting point, is preferred. For fulfilling this condition, a decoloring agent which forms a non-crystalline state when cooled down with a speed higher than or equal to 1° C./min from the melting point to glass transition point, and most preferable is a decoloring agent which forms a non-crystalline state when cooled down with a speed higher than or equal to 20° C./min from the melting point to glass transition point.

Since a liquid state is present in a supercooled state at a temperature lower than or equal to a melting point, as a decoloring agent to be used for detection of a lower limit temperature excursion, it is preferable that the temperature range of the supercooled state is large, namely that the decoloring agent has a large temperature difference between the solidifying point and the melting point. Further, the temperatures at the melting point and at the solidifying point are relevant to the intended temperature control range.

For initialization of function, it is necessary to elevate temperature higher than respective melting points of the decoloring agent of the temperature indicating material to be used for detection of upper limit temperature excursion and of the decoloring agent of the temperature indicating material to be used for detection of lower limit temperature excursion. For an initialization temperature of function, though a higher temperature is necessary because the initialization should not likely occur at a temperature close to the control temperature, it is preferable that the initialization temperature is in a temperature region which can be achieved with a generally used heating apparatus, when a practicability is considered. Further, since, as a temperature detecting material, a matrix material or a substrate material for an indicator is used for protecting the temperature indicating material, it is necessary to consider the heat resistance of these materials. Specifically, a temperature region of 40° C. to 200° C. is preferable, and 60° C. to 150° C. is most preferable.

<Temperature Detecting Material>

In order to use a combination of the above-mentioned temperature indicating materials for a temperature detecting material, a plurality of embodiments are available. When an upper limit detecting material and a lower limit detecting material are mixed, since the respective functions are interfered, a structure for separation is needed. Further, in the lower limit detecting material, the structure of the temperature indicating material is changed, since the color development is caused by crystallization of liquid. Therefore, from a viewpoint of handling, an embodiment for protecting the liquid is needed.

From this viewpoint, normally the temperature indicating material is protected with a microcapsule. By microencapsulating the temperature indicating material for upper limit detection and the temperature indicating material for lower limit detection respectively, and by mixing them, such mixture can achieve detection of both upper limit and lower limit. However, it is not limited to microencapsulation. For example, by use of a solidified material in which the temperature indicating material is protected with a matrix material having no color developing and no decoloring actions, it is possible to be handled similarly to the microcapsule. Further, in the temperature indicating material of the upper limit detection, the color development occurs when the non-crystalline state turns to the crystalline state. Therefore, the color change occurs in a solid state. Therefore, as the upper limit detection material, the temperature indicating material alone can be used. However, since it is necessary to melt the temperature indicating material for initialization of function, and since then this material turns to a liquid state, the handling is not easy.

In this way, a solid material enabling a simultaneous detection of upper limit and lower limit can be obtained, for example, by using a microencapsulated temperature indicating material, a phase-separated structure of a temperature indicating material, or the temperature indicating material alone for the upper limit detecting material, and by using a microencapsulated temperature indicating material, or a phase-separated structure of the temperature indicating material for the lower limit detecting material, and further by mixing these materials.

It is also possible to mix the solid material with a solvent to be converted into an ink/paint. When the microencapsulated temperature indicating material, the phase-separated structure of a temperature indicating material, or the temperature indicating material alone is used, it is possible to convert them into an ink/paint, by selecting a solvent against which these materials have a resistance.

Further, without using a solidified material of a temperature indicating material, also the temperature indicating material can be converted into a temperature indicator enabling a simultaneous detection of upper limit and lower limit, by arranging the temperature indicating material to be contained as an indicator in a substrate material such as resin, glass, or porous material. In this case, also a material, which is prepared by microencapsulation or by solidification using a phase-separated structure, can be used.

<Microencapsulation>

By microencapsulation, the environment resistance of the composition against light, humidity and the like are improved as mentioned above, and thus it becomes possible to achieve a storage stability, a stabilization of color changing characteristic and the like. Further, by the microencapsulation, it is possible to suppress the influence that the leuco dye, the developer and the decoloring agent suffer from other compounds such as resin agents and additives, when prepared into an ink, a coating or the like.

For the microencapsulation, known various methods can be applied. For example, an emulsification polymerization process, a suspension polymerization process, a coacervation process, an interface polymerization process, a spray drying process and the like can be considered, but it is not limited to these. Further, two or more kinds of different methods may be combined.

As a resin membrane used for the microcapsule, a urea resin membrane formed of a polyvalent amine and a carbonyl compound, a melamine resin membrane formed of a melamine-formalin prepolymer, a methylolmelamine prepolymer and a methylated melamine prepolymer, a urethane resin membrane formed of a polyvalent isocyanate and a polyol compound, an amide resin membrane formed of a polybasic acid chloride and a polyvalent amine, vinyl-based resin coatings formed of various monomers such as vinyl acetate, styrene, (meth)acrylic acid esters, acrylonitrile and vinyl chloride can be considered, but it not limited to these. Further, additional treatments such as improvement of the dispersion stability of the microcapsules are possible by carrying out a surface treatment of the formed resin membrane to adjust the surface energies against the ink or while converting into a paint.

Further, the diameter of the microcapsule is preferably in the range of about 0.1 to 100 µm, more preferably in the range of 0.1 to 10 µm, since conformity to an apparatus, storage stability and the like are important issues.

<Arrangement of Phase-Separated Structure Body>

The phase-separated structure body is defined by that a leuco dye, a color developing agent, and a decoloring agent are dispersed in a matrix material to form a solidified material. Due to this, by use of an easy method, other than microencapsulation, a storage stability, a stabilization of color changing characteristic and the like become can be achieved similar to microencapsulation. Further, it is possible to suppress the influence that the leuco dye, the color developing agent and the decoloring agent suffer from other compounds such as resin agents and additives, when prepared into an ink, a paint or the like.

(Matrix Material)

The matrix material should be a material, of which color developing and decoloring characteristics are not impaired, when it is mixed with a temperature indication material. Therefore, it is preferable that the matrix material itself is a material which does not show a color developing characteristic. As such a material, it is possible to use a non-polar material which is not an electron acceptor.

Further, in order to form a phase-separated structure that a temperature indicating material is dispersed in a matrix material, the matrix material should satisfy the following three conditions. The three conditions are: the matrix material is solid at an operation temperature of the temperature detecting material, has a melting point higher than the melting point of the temperature indicating material, and has a low compatibility with leuco dye, decoloring agent, and color developing agent. This is because, in a state that any material of leuco dye, color developing agent, and decoloring agent are in a solid solution, the temperature detecting function is impaired. Further, by use of the matrix material, which is a solid at an operation temperature, the temperature detecting material can be easily handled.

As a matrix material satisfying the above conditions, it is preferable to use a material having an energy $\delta d$, which is due to a dipole interaction between molecules as predicted from a Hansen solubility parameter, and an energy $\delta h$, which is due to hydrogen bonding between molecules, are respectively less than 3. Specifically, it is preferable to use a material constituted only with materials having no polar group, or hydrocarbons having no polar group. Specifically, a wax such as paraffin, microcrystalline, olefin, polypropylene, polyethylene, and low molecular weight materials and polymer materials having many skeletons such as propylene, ethylene, styrene, cycloolefin, siloxane, terpene, and a co-polymer of these can be considered.

Among these, a material, which turns to a melt with low viscosity at or above melting point and easily turns to a solid state at or below the melting point, is easily handled. Further, also a material, which dissolves in an organic solvent and solidifies in a process of volatilization of the solvent, is also easily handled. Specifically, paraffin wax, microcrystalline wax, polyolefin, terpene resin can be considered.

As a polyolefin, for example, a low molecular weight polyethylene, a low molecular weight polypropylene, etc. can be considered. Though, in particular, it is not specified about the molecular weight of polyolefin and about viscosity of its liquid state, a good formability can be obtained if it has a low viscosity in liquid state, since less bubbles are contained. Specifically, a molecular weight of lower than or equal to 50,000, and a viscosity of lower than or equal to 10 Pa·S are preferable, and further, a molecular weight of lower than or equal to 10,000, and a viscosity of lower than or equal to 1 Pa·S are more preferable.

Further, it is possible to parallelly use a plurality of kinds from these matrix materials.

Further, even a matrix material, which is a liquid at an operation temperature, can be also used as a temperature indicating material, if it manifests characteristics as a temperature indicating material and a phase-separated structure. When the matrix material is a liquid having a high viscosity, its handling is also good similar to a matrix material of a solid state. However, in a case that the matrix material is a liquid having high viscosity, it is inevitable that the temperature indicating material within the matrix material may sink during a long operation time, resulting in two separated layers. Therefore, a long-term stability as a temperature detecting material is inferior.

<Phase-Separated Structure Body>

Figure 6A:
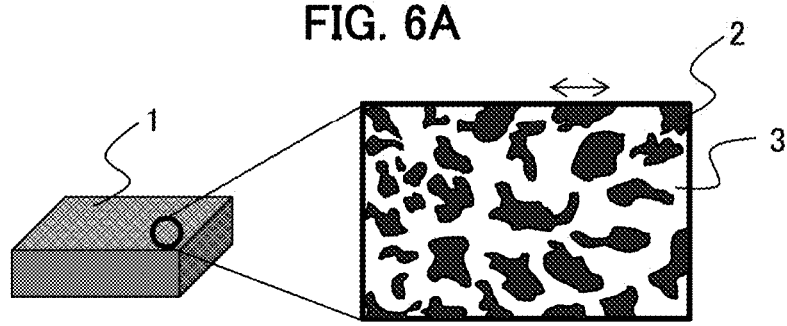
FIGS. 6A-6B show a schematic diagram illustrating a phase-separated structure, wherein FIG. 6A stands for a state of color developing, and FIG. 6B stands for a state of decoloring.
Figure 6B:
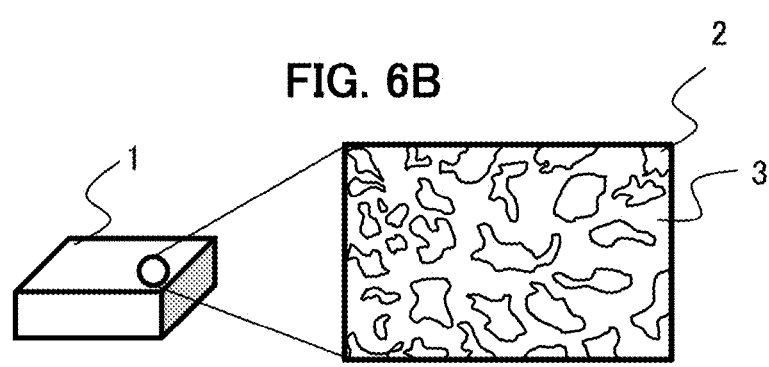

FIG. 6 shows a schematic diagram illustrating a phase-separated structure, wherein FIG. 6A stands for a state of color developing, and FIG. 6B stands for a state of decoloring. The temperature detecting material 1 forms a phase-separated structure in which the temperature indicating material 2 is dispersed in the matrix material 3. That is to say, a structure, in which phases including leuco dye, color developing agent, and decoloring agent are dispersed, is formed.

Figure 7A:
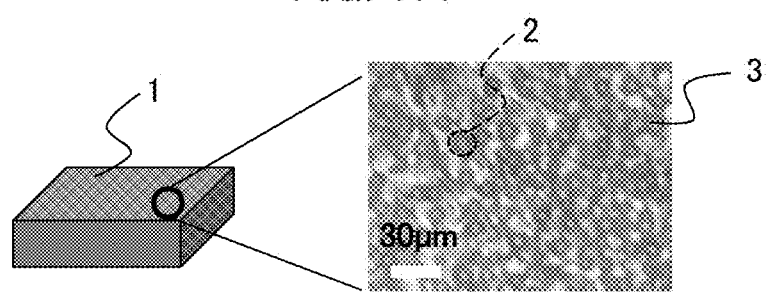
FIGS. 7A-7B show a photograph of a temperature detecting material taken with an optical microscope, wherein FIG. 7A stands for the state of color developing, and FIG. 7B stands for the state of decoloring.
Figure 7B:
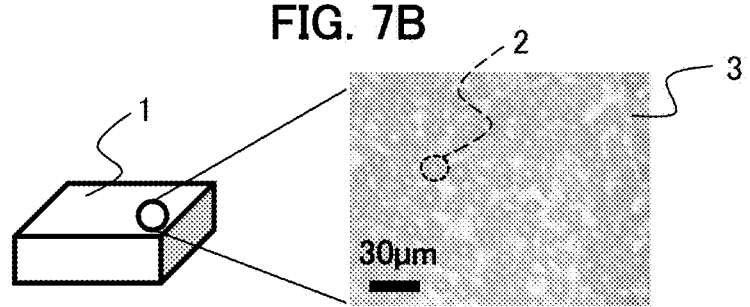

FIGS. 7A-7B show photographs of a temperature detecting material taken with an electron microscope, wherein FIG. 7A stands for the state of color developing, and FIG. 7B stands for the state of decoloring. Namely, FIG. 7A is an electron micrograph of the temperature detecting material 1 which is in a state that the temperature indicating material is color developing, and FIG. 7B is an electron micrograph of the temperature detecting material 1 which is in a state that the temperature indicating material is decoloring. From these electron micrographs, it can be seen that the temperature detecting material 1 forms a phase-separated structure in which the temperature indicating material 2 is dispersed in the matrix material 3.

The temperature detecting material related to the working example has a melting point of the matrix material higher than a melting point of the temperature indicating material, and thus keeps a solid state at the color changing temperature of the temperature indicating material. Due to this, even when a color change occurs accompanying a state change of the temperature indicating material from solid to liquid and from liquid to solid, the temperature detecting material is kept in a solid state.

Further, since the matrix material and the temperature indicating material are phase-separated and therefore the matrix material does not affect the color change of the temperature indicating material, it is possible to keep the temperature detecting function of the temperature indicating material unchanged.

Though the density of the temperature indicating material contained in the matrix material is not specifically limited, it is preferable that the weight ratio range of the matrix material is more than or equal to 0.1 and less than or equal to 100 against the temperature indicating material with weight ratio 1. When the density of the matrix material is less than or equal to weight ratio 100 against the temperature indicating material with weight ratio 1, it is possible to suppress a degradation of visibility as a temperature detecting material. Further, by arranging the density of the matrix material to be more than or comparable to the density of the temperature indicating material, it is possible to suppress forming of a structure in which the matrix material and the temperature indicating material are bonded to each other (hereinafter this structure is called as bicontinuous structure). Even in the bicontinuous structure, since the matrix material and the temperature indicating material are phase-separated, the function as a temperature detecting material is not impaired, however there may occur a fluid leak of the temperature indicating material from the matrix material, which may impair a long-term stability. Therefore, more preferably, the matrix material is arranged to have a weight ratio in the range 1-10 against the temperature indicating material with weight ratio 1.

The long diameter of a phase-separated portion including the temperature indicating material dispersed in the matrix material is preferably more than or equal to 100 nm and less than or equal to 1 mm, and, more preferably, more than or equal to 1 μm and less than or equal to 100 μm. Though the size of a phase-separated portion including the temperature indicating material is not specifically limited, by adjusting the size larger than or equal to 100 nm it is possible to suppress that the detection temperature is affected by the interface between the temperature indicating material and the matrix material. Further, by adjusting the size less than or equal to 1 mm, it becomes difficult to visually differentiate between the temperature indicating material and the matrix material, by which a color unevenness of the temperature detecting material is suppressed. The size of the phase-separated portion including the temperature indicating material can be reduced by adding a tenside or by agitating under cooling in a cooling step. It should be noted that the long diameter of the phase-separated portion including the temperature indicating material represents a long diameter of an approximate oval when a phase including the temperature indicating material is approximated by an oval.

The phase-separated structure body can be pulverized by crushing in a mortar. Due to this, a handling similar to microcapsule becomes possible.

The phase-separated structure body and the microcapsule may be surface-treated with such as silane coupling treatment, surface grafting, corona treatment, for dispersion stabilization for turning these into an ink, for improvement of resistance against solvent, and for improvement of environmental resistance against light or humidity, and the like.

Further, it is also possible to additionally cover the phase-separated structure body and the microcapsule with a matrix material or a microcapsule.

<Manufacturing Method of Phase-Separated Structure Body>

The temperature detecting material related to the working example is manufactured for example by the following method. The manufacturing method of the temperature detecting material includes a mixing step in which a leuco dye, a color developing agent, a decoloring agent, and a matrix material are heated to a temperature higher than or equal to the melting point of the matrix material and mixed, and a cooling step in which a mixture obtained in the mixing step is cooled down to a temperature lower than or equal to the solidifying point. In the cooling step, the matrix material and the temperature indicating material are rapidly phase-separated, and the phase-separated structure, in which the phase-separated portions including the leuco dye, the color developing agent, and the decoloring agent are dispersed, is formed.

When the matrix material is heated and turned into a liquid state, there are cases that the temperature indicating material and the matrix material are compatibilized and that they are not compatibilized, depending on their compatibility to each other. At this time, from the viewpoint of handling, it is preferable that they are compatibilized. At an operation temperature in which the matrix material is in a solid state, the temperature indicating material and the matrix material need to be phase-separated, excluding the case when the matrix material is in a heated state and thus it is in a liquid state. In order to realize that, at the operation temperature, the temperature indicating material and the matrix material are phase-separated, and that, at the heated state, the temperature indicating material and the matrix material are compatibilized, it is preferable that, in particular, the polarity of the decoloring agent of high content is within a certain range. If the polarity of the decoloring material is too low, the decoloring material is compatibilized with the matrix material at the operation temperature, and if the polarity is too high, the decoloring material is separated from the matrix material at the heated state. As a specific calculation method of the polarity, an energy $\delta d$ due to a dipole interaction between molecules as predicted from a Hansen solubility parameter and an energy $\delta h$ due to hydrogen bonding between molecules due to hydrogen bonding can be applied, and a material, of which energies $\delta d$ and $\delta h$ are respectively in the range larger than or equal to 1 and less than or equal to 10, can be preferably used. However, with a material in which the polarity is high and the temperature indicating material and the matrix material are not compatibilized even at the heated state, it is also possible to form a phase-separated structure by agitating these materials under cooling. Further, these materials can also be compatibilized by adding a tenside.

When the matrix material is cooled lower than or equal to the solidifying point to form a phase-separated structure, the size of the dispersion structure of the temperature indicating material variates depending on compatibility between the temperature indicating material and the matrix material. In particular, regarding the decoloring agent and the matrix material which have high contents, if the compatibility between them is considerably good, then the dispersion structure becomes fine, and if the compatibility between them is not good, then the dispersion structure becomes coarse. Specifically, the size of the dispersion structure is not limited, if the size becomes less than 100 nm, it may affect the detected temperature, since the effect of the interface between the temperature indicating material and the matrix element becomes prominent. Further, when the size exceeds 1 mm, the color unevenness of the temperature detector becomes large, since the temperature indicating material and the matrix material can become identifiable visually. Therefore, it is preferable that the size of the dispersion structure is more than or equal to 100 nm and less than or equal to 1 mm, and, in particular, most preferably, more than or equal to 1 µm and less than or equal to 100 µm. Again for realizing this dispersion structure, as a specific calculation method of the polarity, an energy $\delta d$ due to a dipole interaction between molecules as predicted from a Hansen solubility parameter and an energy $\delta h$ due to hydrogen bonding between molecules due to hydrogen bonding can be applied, and a material, of which energies $\delta d$ and $\delta h$ are in the range larger than or equal to 1 and less than or equal to 10, can be preferably used. Further, in the cooling step, it is possible to reduce the side of the dispersion structure by adding a tenside or by agitating under cooling.

<Turning into Ink/Paint>

It is also possible to manufacture a temperature detecting ink/paint which contains a temperature detecting material related to the working example.

The temperature detecting ink includes a temperature detecting material and a solvent. By dispersing the temperature detecting material in the solvent, it becomes possible to be applied to an ink or a paint such as used for a pen, a stamp, a crayon, and an inkjet, etc. As the solvent, a volatile organic solvent can be used.

It is possible to manufacture an ink solution in which the temperature detecting material is dispersed, by fabricating, in advance, a phase-separated structure body which includes a matrix material with a temperature indicating material dispersed therein or a microencapsulated temperature detecting material, and by mixing them with organic solvent or water. Therefore, it is necessary to use an organic solvent which is less compatible with the matrix material containing the temperature indicating material or with the microcapsule.

When a phase-separated structure body employing a matrix material is used, as an organic solvent, it is preferable to use an organic solvent having a high polarity. As a high polarity organic solvent, for example, besides water, alcohols such as glycerin, methanol, ethanol, and propanol are most preferable, and besides, ketones such as acetone, methyl ethyl ketone, cyclohexanone, esters such as ethyl acetate, methyl acetate, ethyl propionate, methyl propionate, and ethers such as dimethyl ether, tetrahydrofuran, can be considered.

When a microencapsulated temperature indicating material is used, as an organic solvent, it is preferable to use a solvent against which the material of the microcapsule is resistant. If a high polarity material is used as a material of the microcapsule, it is preferable to use a low polarity organic solvent, specifically, nonpolar solvents such as hexane, benzene, toluene, etc. and oils such as petroleum, mineral oil, silicone oil are most preferable, and besides, ketones such as acetone, methyl ethyl ketone, cyclohexanone, esters such as ethyl acetate, methyl acetate, ethyl propionate, methyl propionate, and ethers such as dimethyl ether, tetrahydrofuran can be considered.

If a low polarity material is used as the material of the microcapsule, it is preferable to use a high polarity organic solvent, specifically, for example, besides water, alcohols such as glycerin, methanol, ethanol, and propanol are most preferable, and besides, ketones such as acetone, methyl ethyl ketone, cyclohexanone, esters such as ethyl acetate, methyl acetate, ethyl propionate, methyl propionate, and ethers such as dimethyl ether, tetrahydrofuran, can be considered.

These temperature detecting inks have a temperature detecting function also in a liquid state, and further, when they are applied to an object to be printed by printing, writing, and stamping, etc., only the temperature indicating material constitutes the print, since the solvent volatilizes.

For the temperature detecting ink, an additive may be further added to a solution with water or organic solvent, as far as it does not affect the temperature detecting function.

<Ink for Inkjet>

The temperature detecting ink related to the working example can be applied to a charge-control type inkjet printer. The ink for the charge-control type inkjet printer includes a temperature indicating material, a volatile organic solvent, a resin, and a conductive agent.

When the ink solution has a high electrical resistance, the ink particle has a tendency not to fly straight but curved at an ink ejecting portion in the charge-control type inkjet printer. Therefore, it is necessary that the electrical resistance of the ink solution is set to approximately 2,000 Ωcm or less.

Since a resin, a pigment, and an organic solvent (in particular, 2-butanone and ethanol, which are often used as an organic solvent) contained in the ink have a low electrical conductivity, the ink has a high electrical resistance of about 5,000 to several ten thousands Ωcm. If the electrical resistance is high, then a desired printing becomes difficult with a charge-control type inkjet printer. Therefore, it is necessary to add an electroconductive agent.

As the electroconductive agent, a complex is preferably used. It is necessary that the electroconductive agent can be dissolved in the employed solvent, and it is also important that the electroconductive agent does not affect color tones. Further, an electroconductive agent having a salt structure is generally used. The reason for this is that the electroconductive agent has a biased electrical charge distribution in the molecule, and thus it is expected to manifest a high electroconductivity.

As a result of the consideration from the above-mentioned viewpoint, it is preferable that the electroconductive agent has a salt structure and that the cation has a tetraalkylammonium ion structure. The alkyl chain may be either a straight or branched alkyl chain, and the solubility in solvents is improved more as the carbon number increases. However, as the carbon number is smaller, at a smaller addition rate thereof the electrical resistance can be reduced. A realistic carbon number to be used for inks is around 2 to 8.

As the anion, a hexafluorophosphate ion, a tetrafluoroborate ion and the like are preferable since they have high solubility in solvents.

It should be noted that, though a perchlorate ion also has high solubility, it is not realistic to use the perchlorate ion in the ink, since it is explosive. Besides, though the perchlorate ion, chlorine, bromine, iodine ions can also be considered, however, they are not preferable, since, when they contact the metals such as iron and stainless steel, they tend to corrode these metals.

As a result, as a preferable electroconductive agent, tetraethylammonium hexafluorophosphate, tetrapropylammonium hexafluorophosphate, tetrabutylammonium hexafluorophosphate, tetrapentylammonium hexafluorophosphate, tetrahexylammonium hexafluorophosphate, tetraoctylammonium hexafluorophosphate, tetraethylammonium tetrafluoroborate, tetrapropylammonium tetrafluoroborate, tetrabutylammonium tetrafluoroborate, tetrapentylammonium tetrafluoroborate, tetrahexylammonium tetrafluoroborate, tetraoctylammonium tetrafluoroborate, and the like, can be considered.

<Construction of Temperature Indicator>

Figure 8:
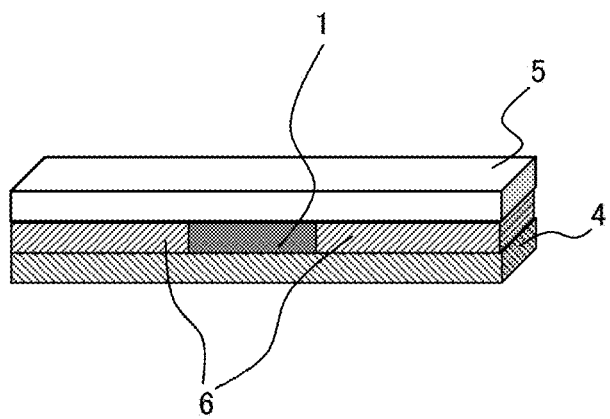
FIG. 8 shows a schematic diagram illustrating a construction of a temperature indicator.

FIG. 8 shows a schematic diagram illustrating a construction of a temperature indicator. The temperature indicator includes a substrate 4, a temperature detecting material 1 arranged on the substrate, a transparent substrate 5 arranged on the temperature detecting material, and a spacer 6, and has a structure that the temperature detecting material is sandwiched between the substrate 4 and the transparent substrate 5.

The materials of the substrate and the transparent substrate are not specifically limited, and they are acceptable, if a color change can be visually identified when the temperature detecting material is sandwiched between the transparent substrate and the substrate.

The material of the substrate can be selected freely according to the required function. An organic material such as paper or plastic, an inorganic material such as ceramic or metal, and a combined material thereof, can be freely chosen. Several kinds of materials can also be used for forming a layered structure. The materials can be selected according to the required characteristics for the temperature indicator, such as high strength, heat resistance, weather resistance, chemical resistance, heat insulation, electroconductivity. By employing a sticker, it is possible to achieve an adhesion onto an object to be temperature-detected.

Preferably, the substrate is larger than the temperature detector, since it is preferable to sandwich the temperature detector.

The material of the transparent substrate can also be selected freely according to the required function. An organic material such as paper or plastic, an inorganic material such as ceramic or metal, and a combined material thereof, can be freely chosen. Since it is necessary to visually identify the color change of at least a portion of the temperature detecting material, the substrate needs to be transparent. For example, as a material of the substrate, a highly transparent paper, an organic material such as a highly transparent plastic, acrylic, polycarbonate, cycloolefin, etc., and a highly transparent inorganic compound such as glass, transparent electrode film, etc., can be considered. Besides these highly transparent materials, a material, of which transparency is enhanced by thinning, is also possible. Several kinds of materials can also be used for forming a layered structure. From these materials, the material of the transparent substrate can be selected according the required characteristics for the temperature indicator, such as strength, heat resistance, weather resistance, chemical resistance, heat insulation, electroconductivity, resistance against thermal shock due to rapid cooling.

The size of transparent substrate is not limited, since it is sufficient if the temperature detector can be identified. From the viewpoint of visibility, in case that the transparent substrate is rectangle, it is preferable that a length along a shorter side of the rectangle is larger than or equal to 30 μm, and in case that the transparent substrate is oval, it is preferable that a shorter diameter is larger than or equal to 30 μm.

As a variant of FIG. 8, the substrate material can be made of a continuous porous material, and this continuous porous material can be impregnated with a temperature detecting material.

By impregnating the continuous porous material with the temperature detecting material, the workability can be varied. The workability depends on the material of the continuous porous material.

As a continuous porous material, it is necessary that the material, in a long-term contact to the temperature detecting material, does not modify the temperature detecting material. Therefore, specifically, a material, such as polyethylene, polypropylene, cellulose, which does not likely dissolve in a usual solvent, is preferable. As an inorganic compound, silicon oxide is also preferable.

As a structure of the continuous porous material, sponge, non-woven cloth, woven cloth, etc. can be considered. In case of cellulose, a paper for making a book or a document can also be used. It is also possible to use a continuous porous material which is formed by a powder of silicon oxide, polyethylene, polypropylene, etc. being retained with a binder having a similar chemical structure of the powder. Since, as the density of the pores of the porous material increases, the density of the impregnated temperature detecting material increases, it is possible to suppress a reduction of color density.

<Manufacturing Method of Temperature Indicator>

A temperature indicator can be manufactured by the following method. A leuco dye, a decoloring agent, and a matrix material are mixed and are heated higher than or equal to the melting point of the matrix material. The liquified temperature detecting material prepared in this way is impregnated into a continuous porous material. Then it is cooled down lower than or equal to the solidifying point of the matrix material.

By the above-mentioned method, it is possible to manufacture the temperature indicator in a form that the temperature detecting material is impregnated into the continuous porous material, wherein the temperature detecting material has formed a phase-separated structure.

<Other Construction of Temperature Indicator>

Figure 9:
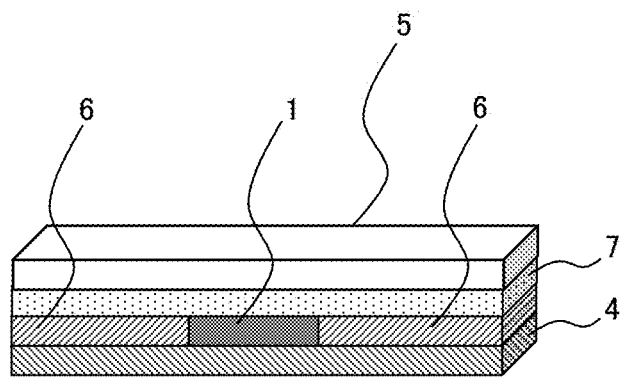
FIG. 9 shows a schematic diagram illustrating a construction of a temperature indicator related to a variation of FIG. 8.

FIG. 9 shows a schematic diagram illustrating a construction of a temperature indicator related to a variation of FIG. 8. The temperature indicator can also include other material between the transparent substrate and the temperature detecting material or above the transparent substrate, as far as in an extent that the temperature detecting material is visible.

The temperature indicator shown in FIG. 9 includes a substrate 4, a temperature detecting material 1 arranged on the substrate, a spacer 6 arranged on the substrate to sandwich the temperature detecting material, a transparent substrate 5 layered on the temperature detecting material, and a printed paper 7. The printed paper 7 is arranged between the temperature detecting material 1 and the transparent substrate 5.

In the temperature indicator shown in FIG. 9, the printed paper is arranged to be sandwiched inside the transparent substrate so that the printed information printed on the printed paper is readable. However, it is necessary to arrange so that a color change of at least a part of the temperature detecting material is visible. For example, a portion of the temperature detecting material can be so arranged that at least a part of the printed paper, which is layered on the temperature detecting material, is cut off, and thus providing a portion on which the printed paper is not layered.

In the transparent substrate and in the substrate, also a machining such as drilling a hole can be applied. By drilling a hole, the printed paper between the transparent substrate and the spacer is exposed. By employing such construction, any information can be entered to the exposed printed paper during transport.

Figure 10:
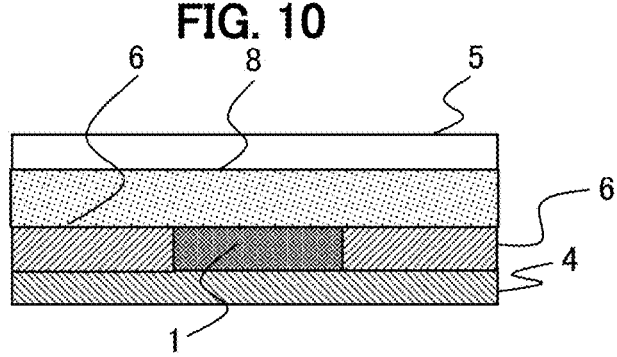
FIG. 10 shows a schematic diagram illustrating a construction of a temperature indicator related to other variation of FIG. 8.

FIG. 10 shows a schematic diagram illustrating a construction of a temperature indicator related to other variation of FIG. 8. The temperature indicator includes a substrate 4, a temperature detecting material 1 arranged on the substrate, a spacer 6 arranged on the substrate to sandwich the temperature detecting material in horizontal direction, a thermal insulation layer 8 arranged on the temperature detecting material 1, and a transparent substrate 5.

The thermal insulation layer 8 can either be layered above the temperature detecting material 1 or below the temperature detecting material. As the thermal insulation layer 8, for example, an air layer, a gas layer of such as argon or nitrogen, a vacuum layer, a sponge, or a porous material such as aerogel, a fiber material such as glass wool, rock wool, cellulose fiber, a foam material such as urethan, polystyrene, foamed rubber can be used.

By arranging the thermal insulation layer 8 above and below the temperature detecting material, the time until the temperature detecting material changes its color after the ambient temperature of the temperature detecting material has become out of the control temperature range (hereinafter this time is referred as temperature detection time) can be adjusted. Further, the temperature detection time can be adjusted by the materials and the thicknesses of the substrate 4 and the transparent substrate 5. Further, in place of newly arranging a thermal insulation layer 8, either the substrate 4 or the transparent substrate 5 can be constituted also by a thermal insulation material.

As explained above, by arranging the thermal insulation layer 8 and by adjusting the material and the thickness of the substrate 4 and the transparent substrate 5, it becomes possible to control the thermal conductivity from the substrate 4 to the temperature detecting material and the thermal conductivity from the transparent substrate 5 to the temperature detecting material.

When the substrate 4 is applied as a sticker to an object, it may be expected that the ambient temperature and the surface temperature of the object are different. If the surface temperature of the object should be detected, this can be achieved by increasing the thermal conductivity from the substrate 4 to the temperature detector (temperature detecting material 1) and by decreasing the thermal conductivity from the transparent substrate 5 to the temperature detector. For example, a thermal insulation layer 8 can be arranged above the temperature detecting material 1, the materials and the thicknesses of the transparent substrate 5 and the substrate 4 can be adjusted, and the thermal conductivity of the substrate 4 can be made higher than the thermal conductivity of the transparent substrate 5. On the other hand, if the ambient temperature should be detected, this can be achieved by decreasing the thermal conductivity from the substrate 4 to the temperature detector (temperature detecting material 1) and by increasing the thermal conductivity from the transparent substrate 5 to the temperature detector. For example, a thermal insulation layer 8 can be arranged below the temperature detecting material 1, the materials and the thicknesses of the transparent substrate 5 and the substrate 4 can be adjusted, and the thermal conductivity of the transparent substrate can be made higher than the thermal conductivity of the substrate.

<Application of Combination>

Regarding the detecting materials for upper limit and lower limit, it is possible to fabricate these detecting materials respectively to include multiple kinds of materials (multiple temperatures) in a similar manner. For example, a material for detecting three upper limit temperatures by use of different colors and a material for detecting two upper limit temperatures and two lower limit temperatures by use of different colors, etc. can be considered, and thus a wide application is possible without being limited to detection of a single upper limit temperature and a single lower limit temperature.

In the following, the present invention will be explained more specifically referring to working examples and comparison examples. It should be noted that the present invention is not limited to these working examples.

(Manufacturing of Temperature Indicator)

Figure 11A:
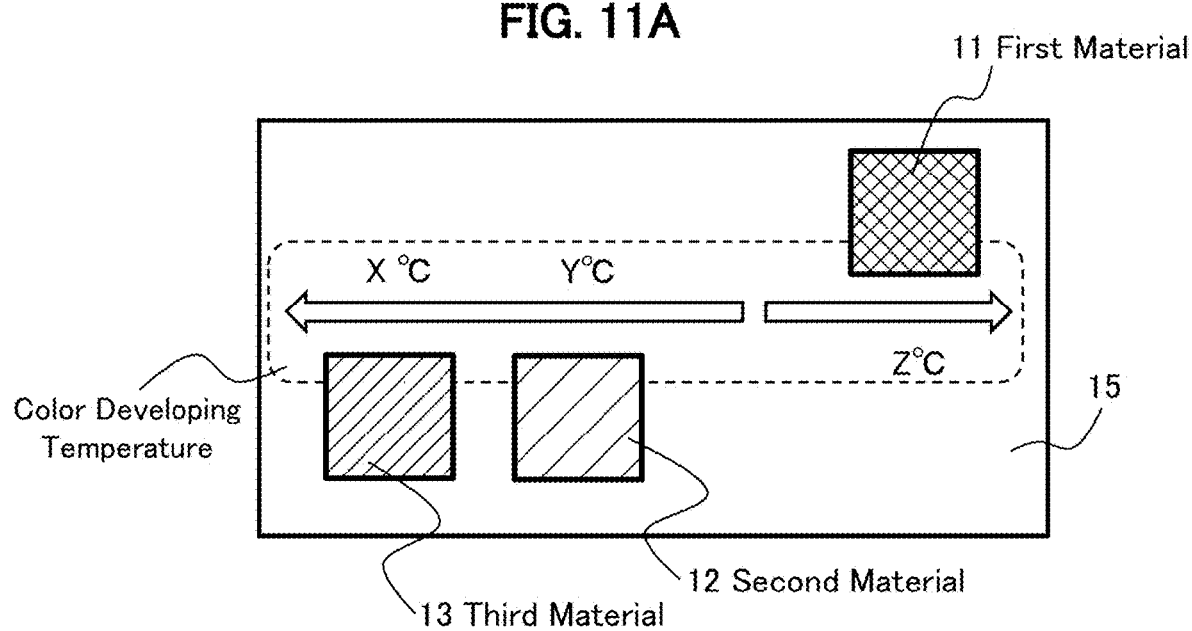
Figure 11B:
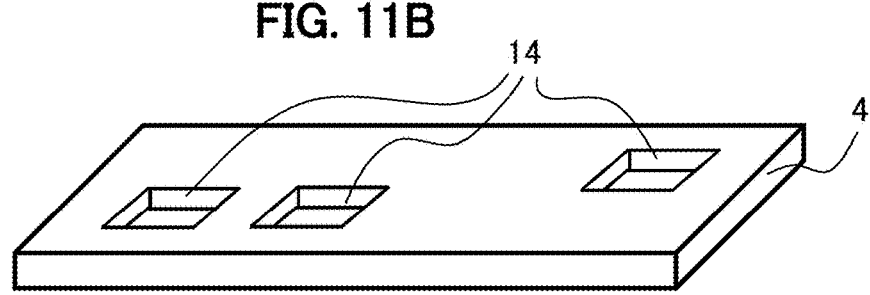
Figure 11C:
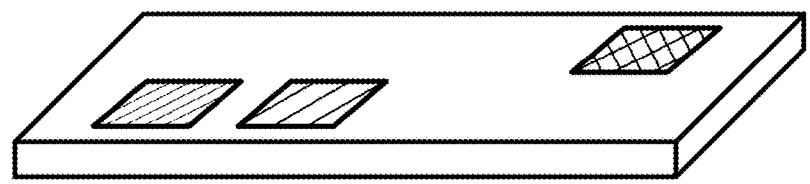

FIGS. 11A-11C show a diagram illustrating a manufacture of a temperature indicator and its verification result, wherein FIG. 11A shows a construction of a temperature indicator, FIG. 11B shows a substrate structure of the temperature indicator, and FIG. 11C shows the verification result. A first material 11, a second material 12 and a third material 13, which are temperature indicating materials, have been fabricated as follows.

For the first material 11, as a leuco dye, 1 weight ratio of 2'-methyl-6'-(N-p-tolyl-N-ethyl amino) spiro [isobenzofuran-1(3H),9'-[9H] xanthen]-3-one (RED520 manufactured by Yamada Chemical Co., Ltd.), as a color developing agent, 1 weight ratio of octyl gallate manufactured by Tokyo Chemical Industry Co. Ltd., as a decoloring agent, 100 weight ratio of vitamin K4 manufactured by Tokyo Chemical Industry Co. Ltd., and as a matrix material, 100 weight ratio of HiWAX NP105 manufactured by Mitsui Chemicals Inc., are used.

For the second material 12, as a leuco dye, 1 weight ratio of 3,3-bis(p-dimethylaminophenyl)-6-dimethylaminophthalide (CVL manufactured by Yamada Chemical Co., Ltd.), as a color developing agent, 1 weight ratio of octyl gallate manufactured by Tokyo Chemical Industry Co. Ltd., as a decoloring agent, 100 weight ratio of a mixture of methyl p-toluate and 2-phenylethyl phenylacetate which are mixed with a weight ratio 9:1, and as a matrix material, 100 weight ratio of HiWAX NP105 manufactured by Mitsui Chemicals Inc., are used.

For the third material 13, as a leuco dye, 1 weight ratio of 3,3-bis(p-dimethylaminophenyl)-6-dimethylaminophthalide (CVL manufactured by Yamada Chemical Co., Ltd.), as a color developing agent, 100 weight ratio of a mixture of methyl p-toluate and 2-phenylethyl phenylacetate which are mixed with a weight ratio 8:2, and as a matrix material, 100 weight ratio of HiWAX NP105 manufactured by Mitsui Chemicals Inc., are used.

As the substrate 4 for the temperature indicator, as shown in FIG. 11, an acrylic plate, which is molded to have dents 14 to be poured with the first material 11, the second material 12, and the third material 13, is used. The first material 11, the second material 12, and the third material 13 are melted at 150° C., a temperature above the melting points of the decoloring agent and the matrix material, and the respective melts are poured into the dents 14 of the acrylic plate and are cooled down naturally, to form phase-separated structure bodies. As shown in FIG. 11A, a temperature indicator is manufactured by applying a sticker film 15, which is made from transparent PET and is printed with characters of temperatures, on the acrylic plate in which the phase-separated structure bodies are formed.

(Verification of Temperature History Indication)

When the manufactured indicator was arranged in an environment of temperature higher than or equal to 10° C., it could be verified that the first material changes its color into red after 1 hour. Similarly, when the manufactured indicator was arranged in an environment of temperature lower than or equal to −10° C., it could be verified that the second material changes its color into blue after 1 hour. Similarly, when the manufactured indicator was arranged in an environment of temperature lower than or equal to −20° C., it could be verified that the second material changes its color into blue after 10 minutes and the third material changes its color into blue after 1 hour. Further, when the temperature indicator, which had once changed its color, was arranged in an environment of 0° C., it could be confirmed that the color changed state is kept. Further, when the color changed temperature indicator was heated up for 10 minutes at 120° C., which temperature is higher than or equal to the melting points of the first material, the second material, and the third material, and is lower than or equal to the melting point of the matrix material, it could be confirmed that the color changed state returns to its initial state. After then, when the manufactured indicator was arranged in an environment of temperature higher than or equal to 10° C., it could be verified that the first material changes its color into red after 1 hour. Similarly, when the manufactured indicator was arranged in an environment of temperature lower than or equal to −10° C., it could be verified that the second material changes its color into blue after 1 hour. Similarly, when the manufactured indicator was arranged in an environment of temperature lower than or equal to −20° C., it could be verified that the second material changes its color into blue after 10 minutes and the third material changes its color into blue after 1 hour.

Based on the above, it has been verified that, by using the temperature indicator related to the present working example, the excursions of the upper limit temperature and the lower limit temperature can be detected, and the function initialization is possible.

In the following, a quality control system employing the temperature indicator will be explained.

FIG. 12 shows a configuration of a quality control system. Here, as an example, it is explained about a quality control system in a distribution route in which a product 20 manufactured in a factory 61 is transported to a store 67, then after controlling the product 20 at the store 67, and then afterwards the product 20 is passed to a customer 68.

The quality control system QCS (product control system) includes a quality control terminal 30 (control terminal) to obtain a code (product identifying information) (for example a bar-code 21) applied to a product 20 and a color tone information of the temperature indicator 22, a control server 40 (control equipment), and a manager terminal 50. The quality control terminal 30, the control server 40, and the manager terminal 50 are communicably connected via a network NW.

The distribution route is configured with a factory 61 in which a product 20 is manufactured, a storehouse 62 for storing the product 20, a shipment floor 63, a transport vehicle 64, a transshipment floor 65 where the product 20 is transshipped, a transport vehicle 66, and a store 67. In respective locations, a responsible person collects information using a quality control terminal 30.

A collection of quality control data information is carried out, for example in the timings such as when the product 20 is manufactured at the factory 61, stored in the storehouse 62, shipped from the shipment floor 63, transported by the transport vehicle 64, transshipped at the transshipment floor 65, transported by the transport vehicle 64, delivered to the store 67, and stored for selling in the store 67.

In the respective locations, a responsible person can confirm visually the condition of temperature control and the record of applied temperature for the product 20 in each process by identifying the color tone of the temperature indicating material. Further, not only to confirm visually by a responsible person, it is preferable to obtain a numerical information regarding the color tone.

In respective steps of shipping, transporting, and storing, etc., a responsible person transmits the acquired quality control information such as visual status of the temperature indicating material of the product 20 and a photographic image thereof, and the location and the time of the acquisition, etc., to the control server 40 using the quality control terminal 30.

For acquiring the visual status of the temperature indicating material, a sensor of the sensing unit 33 (refer to FIG. 17) of the quality control terminal 30 can be used. Due to this, the respective responsible persons during distribution of the product 20 can obtain a numerical information of the color tone of the temperature indicating material as the respective information of the states of the product 20 under control during distribution, and thus the information can be quantitatively controlled and be shared between the responsible persons. It should be noted that, as examples for the numerical information of the color tone, a CIE color space such as L*a*b or L*C*h, and, besides thereof, RGB color space, HSV color space, Munsell color space, etc. can be considered.

In the store 67, regarding the transported product 20, it is possible to visually confirm the temperature control condition and the record of applied temperature to the product 20 after steps of shipping and transporting from the factory. Further, the information, such as the quality control information 426 (refer to FIG. 19) until delivery of the product 20, can be confirmed by accessing the server 200 by use of the quality control terminal 30, etc.

Figure 17:
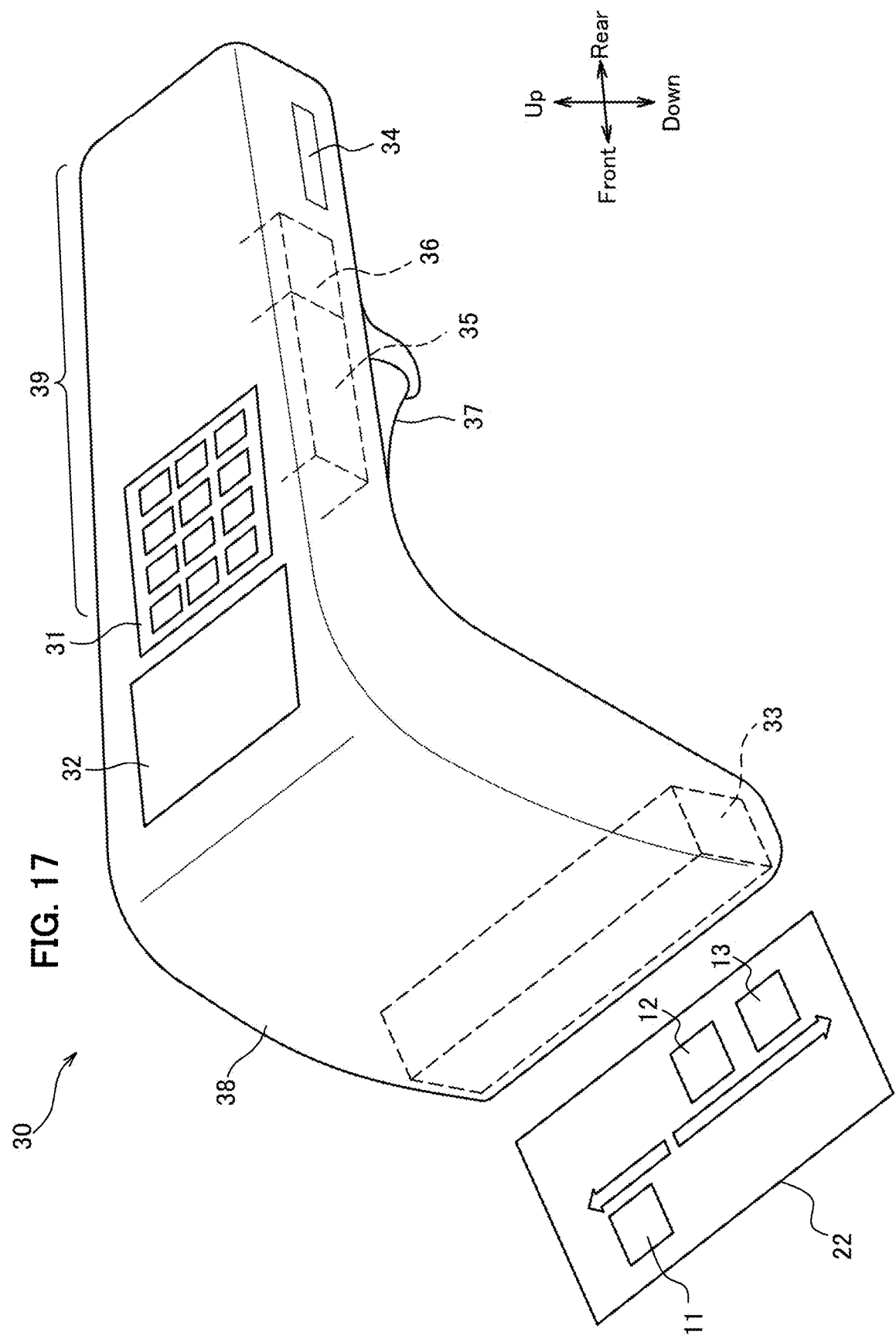
FIG. 17 shows a diagram illustrating an outlook and a configuration of a quality control terminal.

The quality control terminal 30 determines whether the quality is kept or not, based on the product identification information of the bar-code 21 and on the color tone information of the temperature indicator 22, and displays the result of the determination on the display unit 32 (refer to FIG. 17). The responsible person confirms the result. It should be noted that the quality control data including the result of the determination are transmitted to the control server 40 and are recorded by the control server 40 as the quality control information 426 (refer to FIG. 19, FIGS. 20A, 20B).

In this embodiment, the quality determination, whether the quality is kept or not, is conducted on the side of the quality control terminal 30. This is because, in a system which handles a number of products, it is necessary to distribute the determination works for avoiding accumulation of the determination works. In case when the processability of the control server 40 is high, the quality determination can be conducted on the side of the control server 40. It should be noted that the quality determination by the quality control terminal 30 will be explained referring to FIG. 18.

Figure 13:
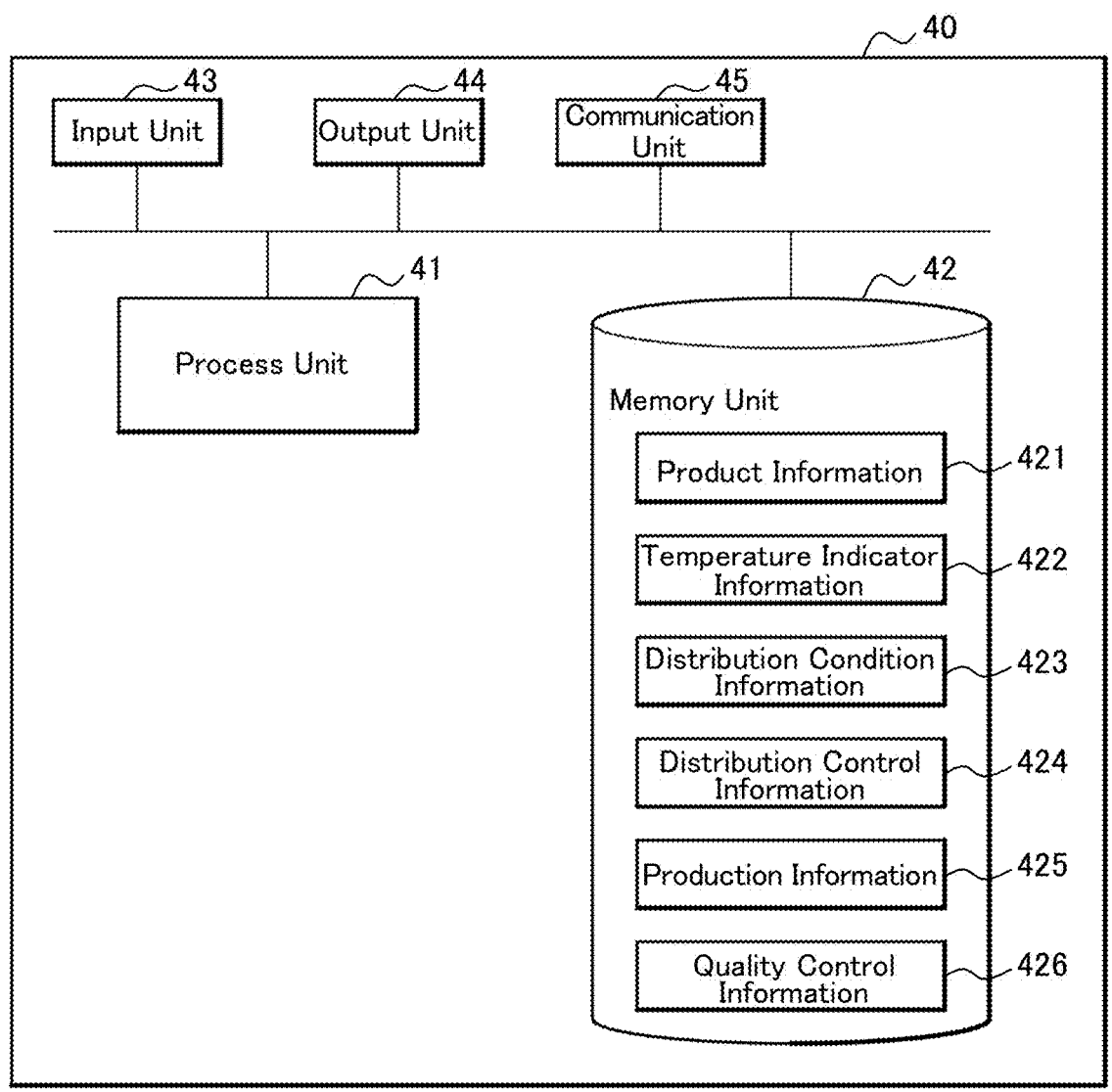
FIG. 13 shows a diagram illustrating a configuration of a control server.

FIG. 13 shows a diagram illustrating a configuration of a control server. The control server 40 includes a process unit 41, a memory unit 42, an input unit 43, an output unit 44, and a communication unit 45. In the memory unit 42 of the control server 40, product information 421 which is detailed information of each product under control, temperature indicator information 422, distribution condition information 423, distribution control information 424, production information 425, quality control information 426, etc., is recorded. The control server 40 performs, along with transferring information to/from the quality control terminal 30, notifying to the manager terminal 50 that the quality of the product 20 is determined as "attention" or as "stop". When the manager receives the notification via the manager terminal 50, the manager calls for attention against the product distribution, or instructs to stop the product distribution.

FIG. 14 shows a diagram illustrating product information stored in the control server. The product information 421, which is information of the product under control, contains such as code (product identifying information), name (product name), production date, date limit of distribution, size, price, surface color tone, necessity of temperature control regarding temperature indicator 22, proper temperature, and location of the temperature indicator (marking location).

For example in a case that the code is "4512345678906", exemplarily, the product name is "AA1", the necessity of temperature control is "Yes", the proper temperature is "2-10° C.", and the location of the temperature indicator 22 is "beside bar-code". Or in a case that the code is "4512345678913", exemplarily, the product name is "BB1", the necessity of temperature control is "Yes", the proper temperature is "0-20° C.", and the location of the temperature indicator 22 is "external top surface". In the case of this product, since the necessity of temperature control is "Yes", a responsible person for the distribution acquires the color tone information of the temperature indicator 22 on the instructed location by use of the quality control terminal 30.

FIGS. 15A-15E show a diagram illustrating a relationship between a proper temperature and a control temperature for a product, wherein FIG. 15A is for a case of a control by use of one upper limit and one lower limit, FIG. 15B is for a case of a control by use of one upper limit and two lower limits, FIG. 15C is for a case of a control by use of two upper limits and one lower limit, FIG. 15C is for a case of a control by use of two lower limits, and FIG. 15E is for a case of a control by use of two upper limits.

In the case of a control using one upper limit and one lower limit as shown in FIG. 15A, the proper temperature and the control temperature are in a same temperature range. Therefore, the selection of the temperature indicating materials is determined by the color developing temperature $T_{a2B}$ for the lower limit, and by the color developing temperature $T_{a1A}$ for the upper limit. In the case of a control using one upper limit and two lower limits as shown in FIG. 15B, the control temperature is higher than or equal to the value which is calculated by adding a predetermined margin to the proper temperature. Therefore, the selection of the temperature indicating materials is determined by the color developing temperatures $T_{a3Bx}$, $T_{a2B}$ for the lower limits, and by the color developing temperature $T_{a1A}$ for the upper limit. In the case of a control using two upper limits and one lower limit as shown in FIG. 15C, the control temperature is lower than or equal to the value which is calculated by subtracting a predetermined margin from the proper temperature. Therefore, the selection of the temperature indicating materials is determined by the color developing temperatures $T_{a1A}$, $T_{a2Ax}$ for the upper limits, and by the color developing temperature $T_{a3B}$ for the lower limit. In the case of a control using two lower limits as shown in FIG. 15D, the control temperature is higher than or equal to the value which is calculated by adding a predetermined margin to the proper temperature. Therefore, the selection of the temperature indicating materials is determined by the color developing temperatures $T_{a3Bx}$, $T_{a2B}$ for the lower limits. In the case of a control using two upper limits as shown in FIG. 15E, the control temperature is lower than or equal to the value which is calculated by subtracting a predetermined margin from the proper temperature. Therefore, the selection of the temperature indicating materials is determined by the color developing temperatures $T_{a1A}$, $T_{a2Ax}$ for the upper limits.

FIG. 16 shows a diagram illustrating temperature indicator information stored in the control server. The temperature indicator information 422, which is information of the temperature indicator applied to the product under control, contains such as code (product identifying information), proper temperature, temperature for first determination, temperature for second determination, temperature for third determination, and comments. The temperature for first determination is the lower one of the lower limit temperatures, the temperature for third determination is the higher one of the upper limit temperatures, and the second determination temperature satisfies the relation: temperature for first determination<temperature for second determination<temperature for third determination.

For example, in the case that the code is "4512345678906", since the proper temperature is "2-10° C." and the control is done by use of one upper limit and two lower limits, the third determination temperature is set to "10° C." as a color developing temperature for an upper limit, the temperature for first determination is set to "5° C." as a color developing temperature for a lower limit, and the temperature for first determination is set to "2° C." as a color developing temperature for a lower limit. Further, in the case that the code is "4512345678913", since the proper temperature is "0-20° C." and the control is done by use of two upper limits and one lower limit, the temperature for third determination is set to "20° C." as a color developing temperature for an upper limit, the temperature for second determination is set to "15° C." as a color developing temperature for an upper limit, and the temperature for first determination is set to "0° C." as a color developing temperature for a lower limit.

Further, in the case that the code is "4512345678937", since the proper temperature is "<8° C." and the control is done by use of two upper limits, the temperature for first determination is not set, the temperature for second determination is set to "2° C." as a color developing temperature for an upper limit, and the temperature for third determination is set to "7° C." as the color developing temperature for an upper limit. It should be noted that similar setting is applied to the case that the code is "4512345678944". Further, in the case that the code is "4512345678951", since the proper temperature is "≥15° C." and the control is done by use of two lower limits, the temperature for first determination is set to "16° C." as a color developing temperature for a lower limit, the temperature for second determination is set to "21° C." as a color developing temperature for a lower limit, and the temperature for third determination is not set.

FIG. 17 shows a diagram illustrating an outlook and a configuration of a quality control terminal. FIGS. 11A-11C, 12 are referred as necessary. The quality control terminal 30 includes a display unit 32 on upper surface of a housing 38, and an input unit 31 for inputting numerals/characters. On the front side of the quality control terminal 30, a sensing unit 33 is provided. On the lower side of a gripping portion 39 of the housing 38, a switch 37 used for sensing the code (product identifying information) (for example a one-dimensional bar-code, QR Code®) by the sensing unit 33 is provided. This switch 37 is used also for acquiring the color tone information of the temperature indicator 22. In the housing 38, a process unit 35 for determining whether a color change is present or not, a communication unit 36 for communicating with a control server 40, a memory unit 34, etc. are arranged. Further, the quality control terminal 30 has a GPS (Global Positioning System)-function for acquiring a positional information.

For the sensing unit 33, the detecting method can be different dependent on the object for identification applied to the product 20 under control. When a bar-code is applied, for example a bar-code reader using infrared light can be considered. Further, for a two-dimensional code such as QR code, an image sensor such as a camera can be considered, and for an electronic tag (for example RF tag), a dedicated sensing unit such as a RFID system can be considered. In the present embodiment, for acquiring the product information as well as the color and visual status of the temperature indicating material, a CCD camera is employed as a detector for the sensing unit 33.

As the memory unit 34, SDRAM (Synchronous Dynamic Random Access Memory), EEPROM (Electrically Erasable Programmable Read-Only Memory), SD memory card, etc. can be used. The process unit 35 can be implemented by executing a program on a memory by use of a CPU (Central Processing Unit).

Figure 18:
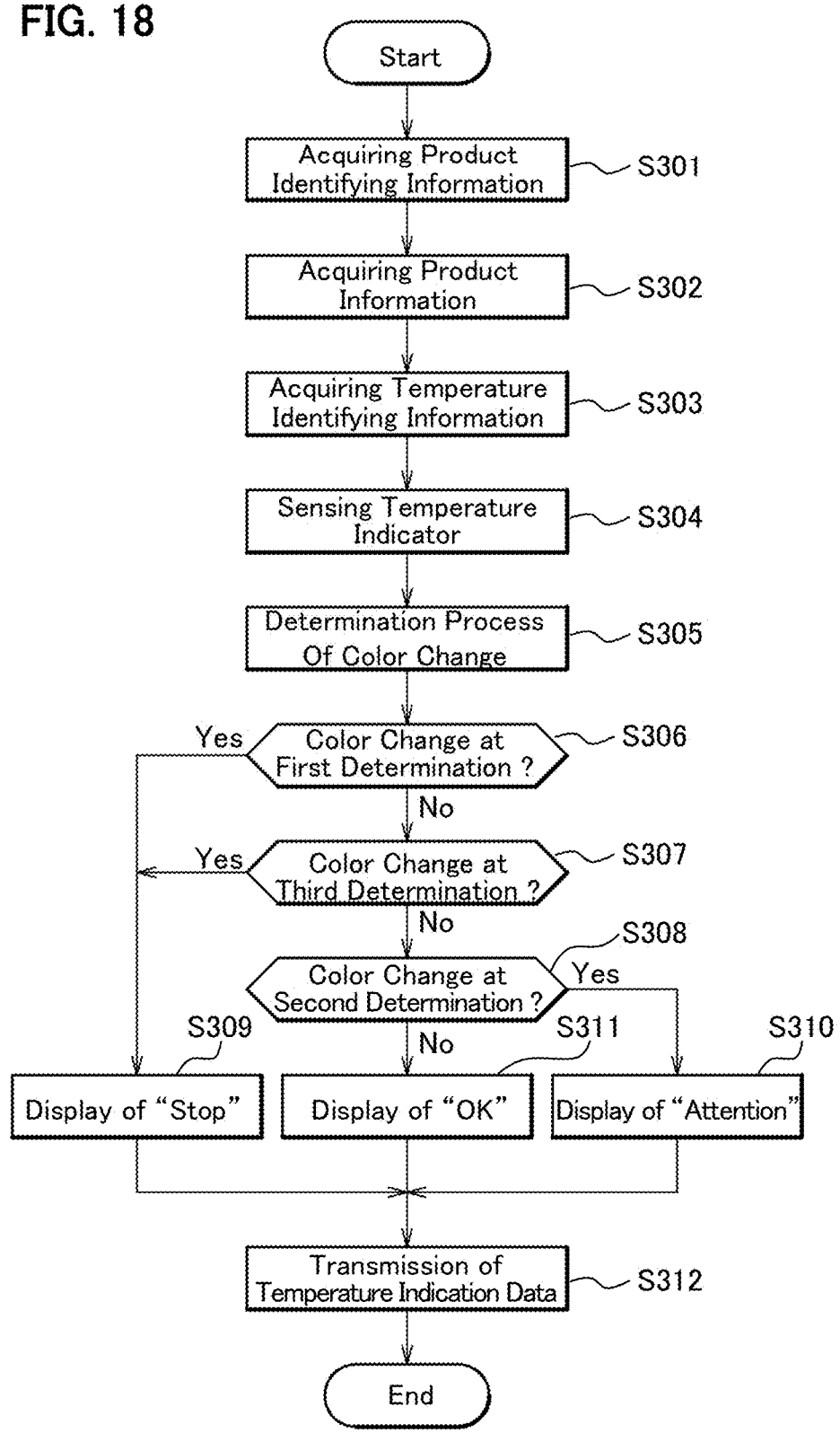
FIG. 18 shows a flow chart of a process at the quality control terminal.

FIG. 18 shows a flow chart of a process at the quality control terminal. FIG. 14, FIG. 16, FIG. 17 are referred as necessary. The responsible person acquires the quality control data by use of the quality control terminal 30. The following processing is a processing by the process unit 35 of the quality control terminal 30.

The process unit 35 acquires a code (product identifying information) (for example bar-code) by pressing the switch 37, and transmits the product identifying information to the control server 40 via the communication unit 36 (step S301). Then, the control server 40 transmits the product information 421 based on the product identifying information and the temperature indicator information 422 to the quality control terminal 30.

The process unit 35 acquires the product information 421 (step S302) and acquires the temperature indicator information 422 (step S303). The process unit 35 acquires a color tone information of the temperature indicator 22 via the sensing unit 33 (step S304). Then, the process unit 35 conducts determination of color change for respective materials (first material 11, second material 12, third material 13) of the temperature indicator (step S305).

The process unit 35 determines whether a color change is present or not in the first determination (step S306), and if a color change is present (Yes in step S306), then proceeds to step S309, and if a color change is not present (No in step S306), then proceeds to step S307.

In step S307, the process unit 35 determines whether a color change is present or not in the third determination, and if a color change is present (Yes in step S307), then proceeds to step S309, and if a color change is not present (No in step S307), then proceeds to step S308.

In step S308, the process unit 35 determines whether a color change is present or not in the second determination, and if a color change is present (Yes in step S308), then proceeds to step S310, and if a color change is not present (No in step S308), then proceeds to step S311.

In step 309, the process unit 35 displays on the display unit 32 that the distribution is in "stop", and transmits a temperature indication data including product identifying information, acquiring time, acquiring location, and determination results (including the determination results for first determination, second determination, and third determination) to the control server 40 (step S312), and the processing is completed. Further, in step S310, the process unit 35 displays on the display unit 32 that the distribution is in "attention", and transmits a temperature indication data including product identifying information, acquiring time, acquiring location, and determination results to the control server 40 (step S312), and the processing is completed. Further, in step S311, the process unit 35 displays on the display unit 32 that the distribution is in "OK", and transmits a temperature indication data including product identifying information, acquiring time, acquiring location, and determination results to the control server 40 (step S312), and the processing is completed.

The fact that the distribution is in "stop" means that it is inappropriate to sell the product to a consumer, the customer 68, since the predetermined control temperature has not been kept in the distribution stage. In this case, preferably, the control server 40 starts a redelivery procedure for a product 20 which was in "stop".

The fact that the distribution is in "attention" means that, though the predetermined control temperature has been kept in the distribution stage, it becomes unable to keep the control temperature when the distribution is continued keeping the present condition. Therefore, it becomes necessary, for example, that the responsible persons of the transport vehicle 64, 66 are requested to apply a work-around such as reducing the setting temperature of the refrigerator below a predetermined value.

FIG. 19 shows an example, when distribution of the quality control information stored in the control server is normal. FIGS. 11A-11C and FIG. 13 are referred as necessary. The quality control information 426 contains such as code (product identifying information), acquiring time, acquiring location, first determination result, second determination result, third determination result, and overall determination, etc. It should be noted that the acquiring locations correspond to L001, L002, L090, L091, L092, L005 of FIG. 12.

More specifically, a quality control data is acquired at L002 of the store house 62, on Dec. 10, 2016, on Dec. 17, 2016, acquired at L003 of the shipment floor 63 before shipment, and then shipment is done. After then, a quality control date is acquired respectively at L090 of the transport vehicle 64, at L091 of the transshipment floor 65, at L92 of the transport vehicle 64, and the product is delivered to the store 67. Also at L005 of the store 67, it can be seen that a quality control information is acquired several times, on Dec. 21, 2016, on Dec. 28, 2016, . . . . In any of these quality control data, the overall determination is "OK", and therefore the quality of the product 20 is kept.

FIGS. 20A-20B shows an example, when distribution of the quality control information stored in the control server is not normal, wherein 20A is a case of "attention" call, and FIG. 20B is a case of "stop" call.

In the case of FIG. 20A, it can be seen that, in comparison to FIG. 19, an "attention" call is issued, since the second determination is "NG" at L091 of the transshipment floor 65. After then, since the first determination result and the third determination result are "OK" also in the transport vehicle 66, the product transport is continued.

In the case of FIG. 20B, it can be seen that, in comparison to FIG. 19, though initially the overall determination on Dec. 21, 2016 is "OK", a "stop" call is issued based on overall determination, since the second determination is "NG" and the third determination is "NG" on Dec. 28, 2016. When a "stop" call is issued, the control server 40 notifies to the manager terminal 50 for notifying the manager. Due to this, the manager can know at an earlier phase about the condition of the quality control of the product.

The quality control system of the present embodiment, a temperature indicator enabling detection of the temperature increase and the temperature decrease is employed. Due to this, the present quality control system can appropriately check the quality of the product and take an appropriate measure in distribution process, and it provides an advantageous effect that the temperature indicator can be reused.

In the above described embodiment, regarding FIG. 8, though it is explained about whether the color change is present or not, the present invention is not necessarily limited to such. For example, corresponding to a color density of color changes at the first determination of step S306, at the second determination of step S307, and at the third determination of S308, "attention" or "stop" can be displayed.

More specifically, the first material 11 shown in FIG. 11A has a heat accumulation characteristic (color changes to red after 1 hour in ambient temperature higher than or equal to 10° C.), the second material 12 has a cold accumulation characteristic (color changes to blue after 1 hour in ambient temperature lower than or equal to −10° C., color changes to blue after 10 minutes in ambient temperature lower than or equal to −20° C.), and the third material 13 has a cold accumulation characteristic (color changes to blue after 1 hour in ambient temperature lower than or equal to −20° C.). With a temperature indicating material having such heat accumulation characteristic or cold accumulation characteristic, the indicator portion changes its color gradually by heating or cooling. Due to this, based on the color density, it is possible to know the time period (environmental time period) that the product is kept in the environment. Therefore, for example, in the second determination in step S308, when the color density is captured, if an "attention" call is displayed together with "environmental time period" based on the color density, it is effective for quality control in the distribution stage. An example of the "environmental time period" is explained as follows referring to FIG. 21.

FIG. 21 shows a diagram illustrating other example of quality control information stored in the control server. The example of FIG. 21 shows the "environmental time period" based on the color density in the second determination. In the case of FIG. 21, a quality control data is acquired at L002 of the storehouse 62 on Dec. 10, 2016, on Dec. 17, 2016, and is acquired before shipment at L003 of the shipment floor on Dec. 18, 2016, and then shipment is done. Thereafter, a second determination result at L090 of the transport vehicle 64 is "10 min", a second determination result at L091 of the transshipment floor 65 is "20 min", and a second determination result at L092 of the transport vehicle 64 is "40 min". Further, though the second determination result is kept as "40 min" also at L005 of the store 67 on Dec. 21, 2016, the second determination result is "50 min" on Dec. 28, 2016, showing a tendency to increase. Therefore, it can be recognized that there is still room for improvement of control method at the store. In this way, the quality control system QCS of the present embodiment enables to obtain detailed information for quality control.

Summarizing the above, the quality control system QCS (product control system) of the present embodiment includes a control equipment (for example the control server 40), which collects the color tone information of the temperature detecting material applied to a product and controls the environment in which the product is arranged based on the color tone information, and a control terminal (for example, a quality control terminal 30), which acquires a product identifying information applied to a product for identifying the product and acquires a color tone information of the temperature detecting material, wherein the control terminal displays on the display unit whether a color change is present or not when a color tone information is acquired, and also transmits the product identifying information and the color tone information, together with relationship between an acquiring time of the color tone information and a fact whether a color change is present or not, to the control equipment. Due to this, the temperature indicating data acquired at respective locations of the distribution stages can be controlled in an integrated fashion.

The control terminal displays on the display unit that the product is not suited for distribution when there is a color change and displays on the display unit that the product is suited for distribution when there is no color change. Due to this, a responsible person in respective location of the distribution stages can confirm instantly whether the product is transported appropriately.

In the control equipment, a color density-time information, which indicates a relation between the color density of the temperature detection material applied to the product and a time period that the product is arranged in the environment, is stored in the memory unit, the control terminal acquires the color density-time information from the control equipment based on the acquired product identifying information, calculates a time period that the product is arranged in the environment based on the acquired color density of the color tone information and the color density-time information, displays the calculated time period on the display unit, and also transmits the product identifying information and the calculated time period, together with their relation, to the control equipment. Due to this, using the color tone information based on the temperature detecting material having a heat accumulation characteristic and a cold accumulation characteristic, it is enabled to achieve the product control.

REFERENCE SIGNS LIST

1 temperature detecting material
2 temperature indicating material (containing a leuco dye, a color developing agent)
3 matrix material
4 base material
5 transparent base material
6 spacer
7 printed paper
8 insulation layer
11 first material
12 first material
13 third material
14 dent
15 seal film
20 product
21 bar-code
22 temperature indicator
30 quality control terminal (control terminal)
31 input unit
32 display unit
33 sensing unit
34 memory unit
35 process unit
36 communication unit
37 switch
38 housing
39 gripping portion
40 control server (control equipment)
41 memory unit
421 product information
422 temperature indicator information
426 quality control information
50 manager terminal
NW network
QCS quality control system (product control system)

The invention claimed is:

1. A temperature detecting material comprising a first material containing a first temperature indicating material and a second material containing a second temperature indicating material,
wherein
the first temperature indicating material and the second temperature indicating material respectively contain a leuco dye, a color developing agent, and a decoloring agent, and respectively have hysteresis characteristics in their color density-temperature curves,
wherein
the first temperature indicating material has a color developing temperature $T_{a1}$ in a temperature increase process, which is lower than a decoloring temperature $T_{d1}$ in the temperature increase process, and turns to a non-crystalline state and is kept in a decoloring state when cooled down lower than the color developing temperature $T_{a1}$ in the temperature increase process with a predetermined cooling speed or more after melting,
wherein
the second temperature indicating material has a color developing temperature $T_{a2}$, which is lower than a decoloring temperature $T_{d2}$ in a temperature increase process,
and wherein
the color developing temperature $T_{a1}$ in the temperature increase process is lower than the decoloring temperature $T_{d2}$ in the temperature increase process and the color developing temperature $T_{a2}$ is lower than the color developing temperature $T_{a1}$ in the temperature increase process, wherein
the color developing temperature $T_{a2}$ of the second temperature indicating material is a color developing temperature in a temperature decrease process,
and wherein
the second temperature indicating material turns to a liquid state and is kept in a decoloring state when cooled down after melting to a temperature higher than the color developing temperature $T_{a2}$ and lower than the color developing temperature $T_{a1}$ in a temperature increase process of the first temperature indicating material.

2. The temperature detecting material according to claim 1,
wherein
the color developing temperature $T_{a2}$ of the second temperature indicating material is a color developing temperature in a temperature increase process, and the second temperature indicating material turns to a non-crystalline state and is kept in a decoloring state when cooled down to lower than the color developing temperature $T_{a2}$ with a predetermined cooling speed or more.

3. The temperature detecting material according to claim 1,
the temperature detecting material further contains a third material containing a third temperature indicating material, wherein the third temperature indicating material contains a leuco dye, a color developing agent and a decoloring agent, and has a color density-temperature curve of a hysteresis characteristic, wherein the color developing temperature $T_{a3}$ in a temperature decrease process is lower than the decoloring temperature $T_{d3}$ in a temperature increase process, wherein the third temperature indicating material turns to a liquid state and is kept in a decoloring state when cooled down after melting to lower than the color developing temperature $T_{a1}$ and higher than the color developing temperature $T_{a3}$, and wherein the first temperature indicating material, the second temperature indicating material, and the third temperature indicating material have a relation $T_{a3}<T_{a2}<T_{a1}$, $T_{a1}<T_{d1}$, $T_{a1}<T_{d2}$, $T_{a1}<T_{d3}$.

4. The temperature detecting material according to claim 1, wherein the first material and the second material further each contain a matrix material comprising a non-polar material, wherein the first material contains a matrix material having a melting point higher than a melting point of the first temperature indicating material, and forms a phase-separated structure in which the first temperature indicating material is dispersed in the matrix material, and wherein the second material contains a matrix material having a melting point higher than a melting point of the second temperature indicating material, and forms a phase-separated structure in which the second temperature indicating material is dispersed in the matrix material.

5. The temperature detecting material according to claim 1, wherein the first material comprises a microcapsule containing the first temperature indicating material, and wherein the second material comprises a microcapsule containing the second temperature indicating material.

6. The temperature detecting material according to claim 1, wherein the second material comprises a material forming a phase-separated structure in which the second temperature indicating material is dispersed in a matrix material of a non-polar material having a higher melting point than a melting point of the second temperature indicating material, or comprises a material containing a microcapsule containing the second temperature indicating material.

7. The temperature detecting material according to claim 3, wherein the second material is a material forming a phase-separated structure in which the second temperature indicating material is dispersed in a matrix material of a non-polar material having a higher melting point than a melting point of the second temperature indicating material, or a material comprising a microcapsule containing the second temperature indicating material, and wherein the third material comprises a material forming a phase-separated structure in which the third temperature indicating material is dispersed in a matrix material consisting of a non-polar material having a higher melting point than a melting point of the third temperature indicating material, or comprises a material containing a microcapsule containing the third temperature indicating material.

8. The temperature detecting material according to claim 1, wherein melting points of the first material and the second material are between 60° C. and 150° C.

9. A temperature detecting ink, containing the temperature detecting material according to claim 1 and a solvent, and being in a form of ink.

10. A temperature indicator, containing the temperature detecting material according to claim 1 and a solvent, wherein the temperature detecting material is arranged on the substrate.

11. A product control system, comprising a control equipment, which collects color tone information of the temperature detecting material according to claim 1 being applied to a product and controls an environment in which the product is arranged based on the color tone information, and a control terminal which acquires a product identifying information applied to the product for identifying the product and acquires color tone information of the temperature detecting material, wherein the control terminal displays on the display unit whether a color change is present or not when a color tone information is acquired, and also transmits the product identifying information and the color tone information, together with relationship between an acquiring time of the color tone information and a fact whether a color change is present or not, to the control equipment.

12. A product control system according to claim 11, wherein the control terminal displays on the display unit that the product is not suited for distribution when there is a color change and displays on the display unit that the product is suited for distribution when there is no color change.

13. A product control system according to claim 11, wherein the control equipment includes a memory unit which stores a color density-time information, which indicates a relation between the color density of the temperature detecting material applied to the product and a time period that the product is arranged in the environment, and wherein the control terminal acquires the color density-time information from the control equipment based on the acquired product identifying information, calculates the time period that the product is arranged in the environment based on the acquired color density of the color tone information and the color density-time information, displays a calculated time period on the display unit, and also transmit the product identifying information and the calculated time period, together with their relation, to the control equipment.

14. A product control system, comprising a control equipment, which collects a color tone information of the temperature detecting material according to claim 1 being applied to a product and controls an environment in which the product is arranged based on the color tone information, and a control terminal, which acquires a product identifying information applied to a product for identifying the product, wherein the control equipment includes a memory unit which stores a color density-time information, which indicates the relation between the color density of the temperature detection material applied to the product and a time period that the product is arranged in the environment, and wherein the control terminal acquires the color density-time information from the control equipment based on an acquired product identifying information, calculates the time period that the product is arranged in the environment based on the acquired color density of the color tone information and the color density-time information, displays the calculated time period on the display unit, and also transmit the product identifying information and the calculated time period, together with their relation, to the control equipment.

* * * * *